US011507592B2

(12) United States Patent
Yang et al.

(10) Patent No.: US 11,507,592 B2
(45) Date of Patent: Nov. 22, 2022

(54) METHODS AND SYSTEMS FOR ADAPTING MULTIPLE KEY-VALUE STORES

(71) Applicant: Samsung Electronics Co., Ltd., Suwon-si (KR)

(72) Inventors: Zhengyu Yang, San Diego, CA (US); Thomas Edward Rainey, III, Escondido, CA (US); Michael Kurt Gehlen, San Diego, CA (US); Ping Terence Wong, San Diego, CA (US); Venkatraman Balasubramanian, Tempe, AZ (US); Olufogorehan Adetayo Tunde-Onadele, Raleigh, NC (US); Nithya Ramakrishnan, San Diego, CA (US); T. David Evans, San Diego, CA (US); Clay Mayers, San Diego, CA (US)

(73) Assignee: SAMSUNG ELECTRONICS CO., LTD.

(*) Notice: Subject to any disclaimer, the term of this patent is extended or adjusted under 35 U.S.C. 154(b) by 135 days.

(21) Appl. No.: 16/777,882

(22) Filed: Jan. 30, 2020

(65) Prior Publication Data

US 2021/0124754 A1    Apr. 29, 2021

Related U.S. Application Data

(60) Provisional application No. 62/926,418, filed on Oct. 25, 2019.

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/2272* (2019.01); *G06F 16/278* (2019.01);
(Continued)

(58) Field of Classification Search
CPC .. G06F 16/116; G06F 16/119; G06F 16/2272; G06F 16/258; G06F 16/278; G06F 16/84; G06F 16/86
See application file for complete search history.

(56) References Cited

U.S. PATENT DOCUMENTS 9,235,609 B1   1/2016   Pandey et al.
9,971,526 B1   5/2018   Wei et al.
(Continued)

*Primary Examiner* — Diedra McQuitery
(74) *Attorney, Agent, or Firm* — Renaissance IP Law Group LLP

(57) ABSTRACT

A method of adapting a first key-value store to a second key-value store may include determining a conversion strategy based on one or more characteristics of the first key-value store and one or more characteristics of the second key-value store, converting the second key-value store to a converted key-value store based on the conversion strategy, and mapping the first key-value store to the converted key-value store based on a mapping function. The converted key-value store may be accessed on-the-fly. A data storage system may include a key-value interface configured to provide access to a lower key-value store, and a key-value adapter coupled to the key-value interface and configured to adapt an upper key-value store to the lower key-value store, wherein the key-value adapter may be configured to adapt at least two different types of the upper key-value store to the lower key-value store.

11 Claims, 26 Drawing Sheets

(51) Int. Cl.
    *G06F 16/27*     (2019.01)
    *G06F 16/22*     (2019.01)
    *G06F 16/84*     (2019.01)
    *G06F 16/901*    (2019.01)
    *G06F 16/11*     (2019.01)

(52) U.S. Cl.
    CPC .......... *G06F 16/86* (2019.01); *G06F 16/9014* (2019.01); *G06F 16/116* (2019.01); *G06F 16/119* (2019.01)

(56) References Cited

U.S. PATENT DOCUMENTS

| | | | |
|---|---|---|---|
| 10,157,214 B1* | 12/2018 | Abuomar | G06F 16/2365 |
| 10,185,727 B1* | 1/2019 | Wilton | G06F 16/211 |
| 10,235,404 B2 | 3/2019 | Reddy et al. | |
| 10,275,357 B2 | 4/2019 | Choi et al. | |
| 2016/0335106 A1* | 11/2016 | Behere | G06F 9/45558 |
| 2016/0335299 A1* | 11/2016 | Vemulapati | G06F 16/2246 |
| 2019/0349427 A1* | 11/2019 | Rago | H04L 67/1097 |
| 2020/0104377 A1* | 4/2020 | Earnesty, Jr. | G06F 9/4843 |
| 2021/0117437 A1* | 4/2021 | Gibson | G06F 16/254 |

\* cited by examiner

| Case 2 | $(|K_U|==|K_I|\&\&|v_U|_{max}<|v_I|_{max})\&\&ExCon1==T$ |
|---|---|
| User / Device | User Key Size Limit — User Value Size Limit<br>$|k_U|_{max}$ [1\|1\|1\|1\|1\|1\|1] — [ ] $|v_U|_{max}$<br>$||$ ∧<br>Internal Key Size Limit — Internal Value Size Limit<br>$|k_I|_{max}$ [1\|1\|1\|1\|1\|1\|1] — [ ] $|v_I|_{max}$ |
| Solution | User KV Store<br>User Key Size Limit — User Value Size Limit<br>[0\|0\|0\|0\|1\|1\|1] — [UserValue]<br>⇩<br>Converted KV Store<br>Internal Key Size Limit — User Value Size Limit<br>[.\|.\|.\|.\|.\|.\|.] — [ ]<br>⇩<br>Device KV Store<br>Internal Key Usage — Internal Value Usage<br>[.\|.\|.\|.\|.\|.\|.] — [▓▓▓▓▓░░]<br>⏟<br>User Value |

FIG. 12

| Case 9 | $(|K_U|<|K_I| \&\& |v_U|_{max}>|v_I|_{max}) \&\& ExCon3==F$ | | |
|---|---|---|---|
| User | User Key Size Limit $|k_U|_{max}$ [1][1][1][1][1][1][1] | User Value Size Limit | $|v_U|_{max}$ |
| | ∧ | ∨ | |
| Device | Internal Key Size Limit $|k_I|_{max}$ [1][1][1][1][1][1][1][1] | Internal Value Size Limit | $|v_I|_{max}$ |

Solution:

User KV Store

UserKey [0][0][0][0][0][1][1][1] — User Key Size Limit

UserValue — User Value Size Limit, $|v_U|_{max}$

Converted KV Store

Internal Key Size Limit

User Value Size Limit, $|v_U|_{max}$

Device KV Store

Internal Key Usage | Internal Value Usage — Metadata ← Index Shard, $|v_I|_{max}$ Internal Key Usage | Internal Value Usage — UserValue 1

Internal Key Usage | Internal Value Usage — UserValue 2

Internal Key Usage | Internal Value Usage — UserValue 3

} Value Shards

Scale out device by: $s = \dfrac{|K_U| \times \left(1 + \left\lceil \dfrac{|v_U|_{max}}{|v_I|_{max}} \right\rceil \right)}{|K_I|}$

FIG. 25

METHODS AND SYSTEMS FOR ADAPTING MULTIPLE KEY-VALUE STORES

CROSS-REFERENCE TO RELATED APPLICATIONS

This application claims priority to, and the benefit of, U.S. Provisional Patent Application Ser. No. 62/926,418 titled "Universal Methodology For Multitier Key-Value Store Platform Adapting" filed Oct. 25, 2019 which is incorporated by reference.

BACKGROUND

1. Field

This disclosure relates generally to key-value stores and specifically to methods and systems for adapting multiple key-value stores having different characteristics.

2. Related Art

A key-value store is a type of database in which data may be stored and/or processed in key-value pairs. The key may function as an identifier, while the value may typically contain the actual data payload or record. In a typical key-value store, keys and values may take any form such as a number, a string, an object, an image, a file, etc., and the data structure used for each key and value may not need to be defined before deployment or use. Key-value stores are known as associative arrays in contrast to relational databases which may have more rigid, pre-defined data structures.

SUMMARY

A method of adapting a first key-value store to a second key-value store may include, the method comprising determining a conversion strategy based on one or more characteristics of the first key-value store and one or more characteristics of the second key-value store, converting the second key-value store to a converted key-value store based on the conversion strategy, and mapping the first key-value store to the converted key-value store based on a mapping function. The method may further include accessing the converted key-value store on-the-fly. Accessing the converted key-value store on-the-fly may include accessing the second key-value store based on the conversion strategy and mapping function on-the-fly.

Determining the conversion strategy may include evaluating one or more base conditions. Evaluating the one or more base conditions may include comparing a key set space size for the first key-value store to a key set space size for the second key-value store, and comparing a value length limit of the first key-value store to a value length limit of the second key-value store. Determining the conversion strategy may further include evaluating one or more extra conditions. Evaluating one or more extra conditions may include comparing a data storage capacity of the first key-value store to a data storage capacity of the second key-value store. Evaluating one or more extra conditions may further include determining whether the second key-value store can borrow adequate key space from its value space. Evaluating one or more extra conditions may further include determining whether the second key-value store can borrow adequate value space from its key space.

The conversion strategy may include directly using the second key-value store for the converted key-value store. The conversion strategy may further include setting a key size limit and lowest and highest keys for the converted key-value store. The conversion strategy may include borrowing resources within the second key-value store. The conversion strategy may further include a packing arrangement. The packing arrangement may include mapping multiple key-value pairs of the first key-value store to one key-value pair of the second key-value store. The conversion strategy may further include a sharding arrangement. The sharding arrangement may include mapping one key-value pair of the first key-value store to multiple key-value pairs of the second key value store.

The conversion strategy may include scaling out the second key-value store. The conversion strategy may include scaling out the second key-value store in combination with a second conversion strategy. The second conversion strategy may include one of: directly using the second key-value store for the converted key-value store, borrowing resources within the second key-value store for a packing arrangement, and borrowing resources within the second key-value store for a sharding arrangement.

The mapping function may include a 1-to-1 mapping function. The method may further include exposing an application programming interface (API) for the converted key-value store API to the first key-value store. The method may further include binarizing one or more keys of the first key-value store. The method may further include expanding a key set space size for the first key-value store. The conversion strategy may be based on the expanded key set space size for the first key-value store, and the converted key-value store may be configured to store multiple versions of key-value pairs of the first key-value store based on the expanded key set size space. Expanding the key set space size for the first key-value store may include multiplying the key set space size for the first key-value store by a maximum number of versions. The first key-value store may include a hardware key-value store and/or a software key-value store. The second key-value store may include a hardware key-value store and/or a software key-value store.

The method may futher include identifying a conversion case based on the one or more characteristics of the first key-value store and the one or more characteristics of the second key-value store.

Identifying a conversion case may include: determining that a key set space size for the first key-value store is less than a key set space size for the second key-value store, and determining that a value length limit of the first key-value store is less than a value length limit of the second key-value store; and the method may further include converting the second key-value store according to a first conversion case.

Identifying a conversion case may include: determining that a key set space size for the first key-value store is equal to a key set space size for the second key-value store, and determining that a value length limit of the first key-value store is less than a value length limit of the second key-value store; and the method may further include converting the second key-value store according to a second conversion case.

Identifying a conversion case may include: determining that a key set space size for the first key-value store is less than a key set space size for the second key-value store, and determining that a value length limit of the first key-value store is equal to a value length limit of the second key-value store; and the method may further include converting the second key-value store according to a third conversion case.

Identifying a conversion case may include: determining that a key set space size for the first key-value store is equal to a key set space size for the second key-value store, and determining that a value length limit of the first key-value store is equal to a value length limit of the second key-value store; and the method may further include converting the second key-value store according to a fourth conversion case.

Identifying a conversion case may include: determining that a key set space size for the first key-value store is greater than a key set space size for the second key-value store, determining that a value length limit of the first key-value store is less than a value length limit of the second key-value store, determining that a data storage capacity of the first key-value store is less than or equal to a data storage capacity of the second key-value store, and determining that the second key-value store can borrow adequate key space from its value space; and the method may further include converting the second key-value store according to a fifth conversion case.

Identifying a conversion case may include determining that a key set space size for the first key-value store is less than a key set space size for the second key-value store, determining that a value length limit of the first key-value store is greater than a value length limit of the second key-value store, determining that a data storage capacity of the first key-value store is less than or equal to a data storage capacity of the second key-value store, and determining that the second key-value store can borrow adequate value space from its key space; and the method may further include converting the second key-value store according to a sixth conversion case.

Identifying a conversion case may include: determining that a key set space size for the first key-value store is greater than a key set space size for the second key-value store, determining that a value length limit of the first key-value store is less than a value length limit of the second key-value store, and determining that the second key-value store cannot borrow adequate key space from its value space; and the method may further include converting the second key-value store according to a seventh conversion case.

Identifying a conversion case may include: determining that a key set space size for the first key-value store is greater than a key set space size for the second key-value store, and determining that a value length limit of the first key-value store is equal to a value length limit of the second key-value store, determining that a data storage capacity of the first key-value store is greater than a data storage capacity of the second key-value store, determining that the second key-value store cannot borrow adequate key space from its value space, and determining that the second key-value store cannot borrow adequate value space from its key space; and the method may further include converting the second key-value store according to an eighth conversion case.

Identifying a conversion case may include: determining that a key set space size for the first key-value store is less than a key set space size for the second key-value store, determining that a value length limit of the first key-value store is greater than a value length limit of the second key-value store, and determining that the second key-value store cannot borrow adequate value space from its key space; and the method may further include converting the second key-value store according to a ninth conversion case.

Identifying a conversion case may include: determining that a key set space size for the first key-value store is equal to a key set space size for the second key-value store, determining that a value length limit of the first key-value store is greater than a value length limit of the second key-value store, determining that a data storage capacity of the first key-value store is greater than a data storage capacity of the second key-value store, determining that the second key-value store cannot borrow adequate key space from its value space, and determining that the second key-value store cannot borrow adequate value space from its key space; and the method may further include converting the second key-value store according to a tenth conversion case.

Identifying a conversion case may include: determining that a key set space size for the first key-value store is greater than a key set space size for the second key-value store, determining that a value length limit of the first key-value store is greater than a value length limit of the second key-value store, determining that a data storage capacity of the first key-value store is greater than a data storage capacity of the second key-value store, determining that the second key-value store cannot borrow adequate key space from its value space, and determining that the second key-value store cannot borrow adequate value space from its key space; and the method may further include converting the second key-value store according to an eleventh conversion case.

Converting the second key-value store according to the first conversion case may include directly using the second key-value store for the converted key-value store. Converting the second key-value store according to the first conversion case may further include setting a key size limit and lowest and highest keys for the converted key-value store to a key size limit and lowest and highest keys for the second key-value store.

Converting the second key-value store according to the second conversion case may include directly using the second key-value store for the converted key-value store. Converting the second key-value store according to the second conversion case may further include setting a key size limit and lowest and highest keys for the converted key-value store to a key size limit and lowest and highest keys for the second key-value store.

Converting the second key-value store according to the third conversion case may include directly using the second key-value store for the converted key-value store. Converting the second key-value store according to the third conversion case may further include setting a key size limit and lowest and highest keys for the converted key-value store to a key size limit and lowest and highest keys for the second key-value store.

Converting the second key-value store according to the fourth conversion case may include directly using the second key-value store for the converted key-value store. Converting the second key-value store according to the fourth conversion case may further include setting a key size limit and lowest and highest keys for the converted key-value store to a key size limit and lowest and highest keys for the second key-value store.

Converting the second key-value store according to the fifth conversion case may include configuring the converted key-value store to operate according to a packing arrangement. Configuring the converted key-value store to operate according to a packing arrangement may include configuring one or more specifications of the converted key-value store, and configuring a packing resource borrowing function of the converted key-value store. The first key-value store may include one or more first key-value pairs, the second key-value store may include one or more second key-value pairs; and configuring the one or more specifications of the converted key-value store may include: determining a number of first key-value pairs that can be stored in each second key-value pair, and determining a number of second key-value pairs for storing the first key-value store. Configuring the one or more specifications of the converted key-value store may further include setting a key size limit, setting a lowest key, and setting a highest key for the converted key-value store. Configuring the packing resource borrowing function of the converted key-value store may include mapping each of the first key-values to a value of one of the second key-value pairs and an offset within the value.

Converting the second key-value store according to the sixth conversion case may include configuring the converted key-value store to operate according to a sharding arrangement. Configuring the converted key-value store to operate according to a sharding arrangement may include configuring one or more specifications of the converted key-value store, and configuring a sharding resource borrowing function of the converted key-value store. The first key-value store may include one or more first key-value pairs, the second key-value store may include one or more second key-value pairs, and configuring one or more specifications of the converted key-value store may include mapping a key of each first key-value pair to an index shard zone of the second key-value store. A key of a first key-value pair may be stored in a value of a corresponding second key-value pair in the index shard zone. Configuring one or more specifications of the converted key-value store may further include setting a key size limit, setting a lowest key, and setting a highest key for the converted key-value store. Configuring a sharding resource borrowing function of the converted key-value store may include mapping a value of each first key-value pair to a value shard zone of the second key-value store. A value of a first key-value pair may be divided into one or more value shards and stored in one or more values of one or more corresponding second key-value pairs in the value shard zone. One or more value shards of the value of the first key-value pair may be accessed by determining a distance from a corresponding mapped key of the first key-value pair in the index shard zone to the first value shard of the value of the first key-value pair in the value shard zone, and determining a number of shards associated with the value of the first key-value pair.

Converting the second key-value store according to the seventh conversion case may include scaling out the second key-value store. Converting the second key-value store according to the seventh conversion case may further include configuring the converted key-value store to operate according to a packing arrangement. Converting the second key-value store according to the seventh conversion case may further include configuring one or more specifications of the converted key-value store, and configuring a packing resource borrowing function of the converted key-value store. Configuring one or more specifications of the converted key-value store may include setting a key size limit, setting a lowest key, and setting a highest key for the converted key-value store. The first key-value store may include one or more first key-value pairs, the second key-value store may include one or more second key-value pairs, configuring the one or more specifications of the converted key-value store may include: determining a number of first key-value pairs that can be stored in each second key-value pair, and determining a number of second key-value pairs for storing the first key-value store; and configuring the packing resource borrowing function of the converted key-value store may include mapping each of the first key-values to a value of one of the second key-value pairs and an offset within the value.

Converting the second key-value store according to the eighth conversion case may include scaling out the second key-value store, and directly using the second key-value store for the converted key-value store. Converting the second key-value store according to the eighth conversion case may further include setting a key size limit and lowest and highest keys for the converted key-value store to a key size limit and lowest and highest keys for the second key-value store.

Converting the second key-value store according to the ninth conversion case may include scaling out the second key-value store, and configuring the converted key-value store to operate according to a sharding arrangement. Configuring the converted key-value store to operate according to a sharding arrangement may include configuring one or more specifications of the converted key-value store, and configuring a sharding resource borrowing function of the converted key-value store. The first key-value store may include one or more first key-value pairs, the second key-value store may include one or more second key-value pairs, and configuring one or more specifications of the converted key-value store may include mapping a key of each first key-value pair to an index shard zone of the second key-value store. A key of a first key-value pair may be stored in a value of a corresponding second key-value pair in the index shard zone. Configuring one or more specifications of the converted key-value store may further include setting a key size limit, setting a lowest key, and setting a highest key for the converted key-value store. Configuring a sharding resource borrowing function of the converted key-value store may include mapping a value of each first key-value pair to a value shard zone of the second key-value store. A value of a first key-value pair may be divided into one or more value shards and stored in one or more values of one or more corresponding second key-value pairs in the value shard zone. The one or more value shards of the value of the first key-value pair may be accessed by determining a distance from a corresponding mapped key of the first key-value pair in the index shard zone to the first value shard of the value of the first key-value pair in the value shard zone, and determining a number of shards associated with the value of the first key-value pair.

Converting the second key-value store according to the tenth conversion case may include scaling out the second key-value store, and configuring the converted key-value store to operate according to a sharding arrangement. Configuring the converted key-value store to operate according to a sharding arrangement may include configuring one or more specifications of the converted key-value store, and configuring a sharding resource borrowing function of the converted key-value store. The first key-value store may include one or more first key-value pairs, the second key-value store may include one or more second key-value pairs, and configuring one or more specifications of the converted key-value store may include mapping a key of each first key-value pair to an index shard zone of the second key-value store. A key of a first key-value pair may be stored in a value of a corresponding second key-value pair in the index shard zone. Configuring one or more specifications of the converted key-value store may further include setting a key size limit, setting a lowest key, and setting a highest key for the converted key-value store. Configuring a sharding resource borrowing function of the converted key-value store may include mapping a value of each first key-value pair to a value shard zone of the second key-value store. A value of a first key-value pair may be divided into one or more value shards and stored in one or more values of one or more corresponding second key-value pairs in the value shard zone. The one or more value shards of the value of the first key-value pair may be accessed by determining a distance from a corresponding mapped key of the first key-value pair in the index shard zone to the first value shard of the value of the first key-value pair in the value shard zone, and determining a number of shards associated with the value of the first key-value pair.

Converting the second key-value store according to the eleventh conversion case may include scaling out the second key-value store, and configuring the converted key-value store to operate according to a sharding arrangement. Configuring the converted key-value store to operate according to a sharding arrangement may include configuring one or more specifications of the converted key-value store, and configuring a sharding resource borrowing function of the converted key-value store. The first key-value store may include one or more first key-value pairs, the second key-value store may include one or more second key-value pairs, and configuring one or more specifications of the converted key-value store may include mapping a key of each first key-value pair to an index shard zone of the second key-value store. A key of a first key-value pair may be stored in a value of a corresponding second key-value pair in the index shard zone. Configuring one or more specifications of the converted key-value store may further include setting a key size limit, setting a lowest key, and setting a highest key for the converted key-value store. Configuring a sharding resource borrowing function of the converted key-value store may include mapping a value of each first key-value pair to a value shard zone of the second key-value store. A value of a first key-value pair may be divided into one or more value shards and stored in one or more values of one or more corresponding second key-value pairs in the value shard zone. The one or more value shards of the value of the first key-value pair may be accessed by determining a distance from a corresponding mapped key of the first key-value pair in the index shard zone to the first value shard of the value of the first key-value pair in the value shard zone, and determining a number of shards associated with the value of the first key-value pair.

A data storage system may include a key-value interface configured to provide access to a lower key-value store, and a key-value adapter coupled to the key-value interface and configured to adapt an upper key-value store to the lower key-value store, wherein the key-value adapter may be configured to adapt at least two different types of the upper key-value store to the lower key-value store. The lower key-value store may include at least one key-value storage device. The lower key-value store may include a hardware key-value store. The lower key-value store may include a software key-value store. The key-value adapter may include a deployment module configured to convert the lower key-value store to a converted key-value store based on a first conversion strategy, and an on-the-fly (OTF) module configured to enable the upper key-value store to access the converted key-value store on-the-fly according to the first conversion strategy. the deployment module may be configured to convert the lower key-value store to a converted key-value store based on a second conversion strategy, and the on-the-fly (OTF) module may be configured to enable the upper key-value store to access the converted key-value store on-the-fly according to the second conversion strategy. The deployment module may be configured to determine the first conversion strategy based on one or more characteristics of a first type of the upper key-value store and one or more characteristics of the lower key-value store, and map the upper key-value store to the converted key-value store based on a mapping function.

A data storage system may include one or more processors configured to determine a conversion strategy based on one or more characteristics of a first key-value store and one or more characteristics of a second key-value store, and convert the second key-value store to a converted key-value store based on the conversion strategy. The one or more processors may be further configured to map the first key-value store to the converted key-value store based on a mapping function. The one or more processors may be further configured to enable the first key-value store to access the converted key-value store on-the-fly. The one or more processors may be further configured to determine the conversion strategy by comparing a key set space size for the first key-value store to a key set space size for the second key-value store, and comparing a value length limit of the first key-value store to a value length limit of the second key-value store. The conversion strategy may include borrowing resources within the second key-value store. The conversion strategy may include a packing arrangement. The conversion strategy may include a sharding arrangement.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIGS. 11, 12, 13, and 14 illustrate example embodiments of processes for converting a device KV store to a converted KV store based on a directly use (DU) type of conversion strategy according to this disclosure.

FIGS. 25, 26 and 27 illustrate example embodiments of a process for converting a device KV store to a converted KV store based on a scale out and sharding type of resource borrowing strategy according to this disclosure.

DETAILED DESCRIPTION

1. Introduction

Figure 1:
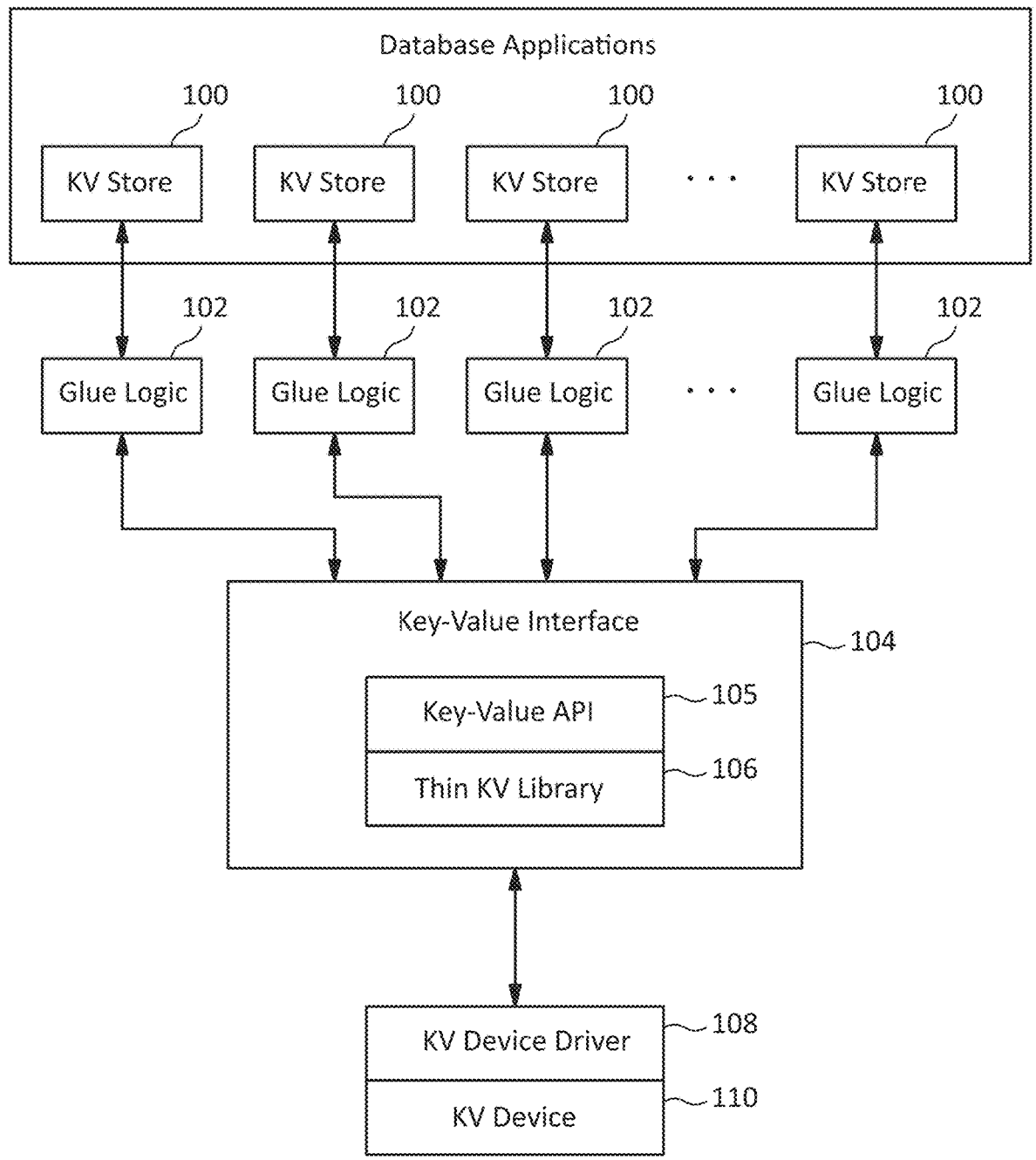
FIG. 1 illustrates a system in which one or more application-level key-value stores may be interfaced to a key-value storage system.

FIG. 1 illustrates a system in which one or more application-level key-value stores may be interfaced to a key-value storage system. The key-value storage system may include one or more key-value (KV) storage devices 110 that may implement key-value storage functionality at the device level. The KV storage devices 110 may be supported by a software stack including one or more device drivers 108 and a key-value interface 104. The key-value interface 104 may expose a key-value API 105 to application-level databases, each of which may implement one or more of the key-value stores 100. The key-value interface 104 may only include a thin KV library 106 when key-value storage functionality is implemented at the device level. In other systems using conventional block storage devices, the software stack may include additional components to convert between key-value and block data structures.

Many different database applications implement key-value stores. Just a few of the many examples include Redis, MongoDB, and DynamoDB. Different key-value stores 100 may have different characteristics that may need to be adapted to operate with the specific key-value store implemented by the KV interface 104. These characteristics may not only be different for each database application, they may also be different for each deployment of a key-value store. Thus, glue logic 102 is typically needed to adapt an application-level key-value store to a key-value storage device or system. Each application-level key-value store and/or deployment may require different glue logic including a unique adapter which may need to be custom built on a one-by-one basis using a manual adapting process. This manual adapting process may be tedious, expensive and/or time-consuming. Moreover, manually built glue logic typically results in many redundant rationales and codes.

Figure 2:
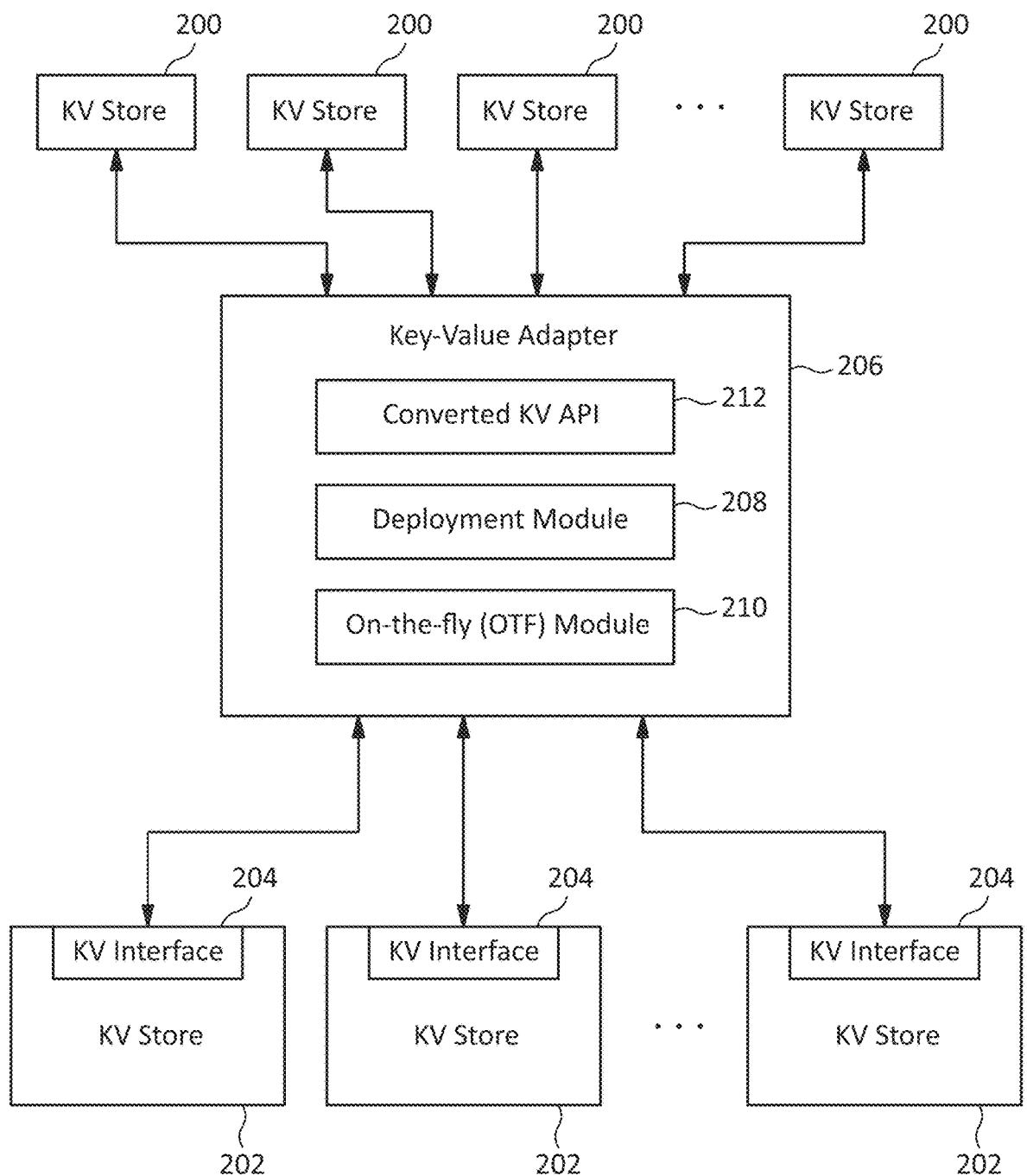
FIG. 2 illustrates an embodiment of a data storage system having a key-value adapter according to the principles of this disclosure.

FIG. 2 illustrates an embodiment of a data storage system having a key-value adapter according to the principles of this disclosure. The system illustrated in FIG. 2 may include one or more upper key-value stores 200 and one or more lower key-value stores 202. Any or all of the upper KV stores 200 and/or lower KV stores 202 may have different characteristics such as different key sizes and/or formats, different value sizes and/or formats, as well as other limitations. These characteristics may be different between upper KV stores, between lower KV stores, and/or between upper and lower KV stores. Any or all of the lower KV stores 202 may include a KV interface 204 configured to provide access to the lower key-value store A key-value adapter 206 may be configured to automatically adapt one or more of the upper key-value stores 200 to one or more of the lower key-value stores 202. Thus, the key-value adapter 206 may enable an upper KV store 200 to operate with a lower KV store 202 having a different set of characteristics without the need for manually building an adapter. Moreover, the key-value adapter 206 may automatically adapt between more than one type of upper KV store 200 and/or more than one type of lower KV store 202.

The key-value adapter 206 may include a deployment module 208 which may be configured to implement a conversion strategy based on the characteristics of one of the upper KV stores 200 and the characteristics of one of the lower KV stores 202. The key-value adapter 206 may also include an on-the-fly (OTF) module 210 which may be configured to continue running after deployment and enable the upper key-value store to access the lower key-value store on-the-fly according to the conversion strategy implemented by the deployment module 208.

Figure 3:
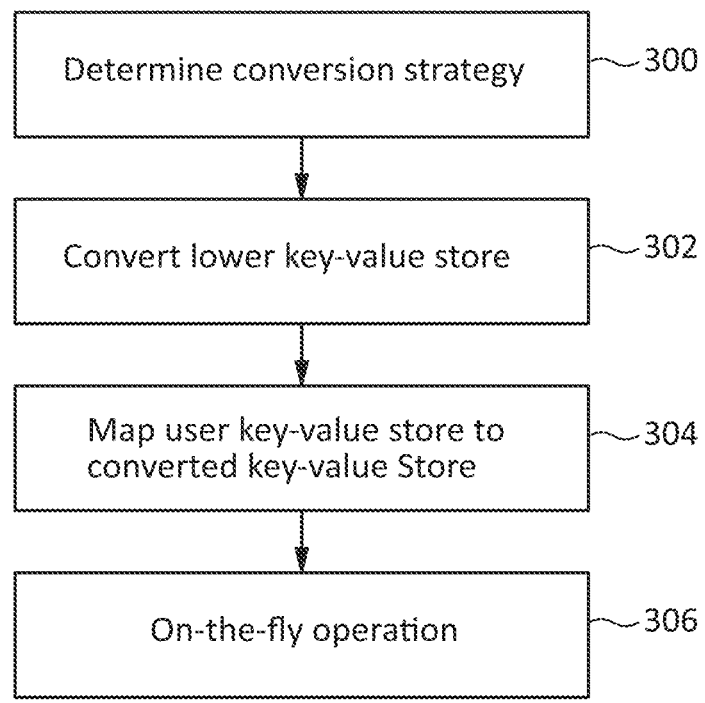
FIG. 3 illustrates a workflow for a key-value adapter according to the principles of this disclosure.

The deployment module 208 may implement a conversion strategy as shown, for example, in FIG. 3 which illustrates a workflow for a key-value adapter according to the principles of this disclosure. At element 300, the deployment module 208 may determine a conversion strategy based on the characteristics of one of the upper KV stores 200 and the characteristics of one of the lower KV stores 202. At element 302, the deployment module 208 may convert the lower key-value store to a converted key-value store based on the determined conversion strategy. At element 304, the deployment module 208 may map the upper key-value store to the converted key-value store based on a mapping function. At element 306, the OTF module 210 may continue running after deployment and enable the upper key-value store to access the converted key-value store on-the-fly according to the conversion strategy and mapping function implemented by the deployment module 208.

The key-value adapter 206 may be configured to enable the upper KV stores 200 to access the deployment and/or OTF functionality by exposing a converted key-value API 212 to the upper KV stores 200. The converted key-value API 212 may be based, for example, on a converted KV store as mentioned above and described in more detail below. The key-value adapter 206 may repeat the deployment and OTF processes to adapt a second one of the upper KV stores 200 to the same or a different one of the lower KV stores 202 using a second conversion strategy based on the characteristics of the second upper KV store and the lower KV store. These deployment and/or OTF processes may be repeated for any number and/or combination of upper KV stores 200 and lower KV stores 202.

Thus, in some embodiments, a key-value adapter according this disclosure may provide an automated paradigm for adapting and/or bridging different KV stores having different characteristics. In some embodiments, a key-value adapter according this disclosure may also consolidate conversion requirements for multiple key-value stores into a single adapter. Moreover, in some embodiments, a key-value adapter according to the principles of this disclosure may reduce the time, cost, and/or effort of deploying, developing, and/or running applications that use key-value storage. A key-value adapter according to the principles of this disclosure may also result in higher I/O speeds.

In the embodiment illustrated in FIG. 2, any of the upper and/or lower KV stores may be implemented as software KV stores, hardware KV stores, or a hybrid combination thereof. The terms "upper" and "lower" may be used as a convenient way to distinguish KV stores on either side of the KV adapter, but "upper" and "lower" may not refer to any physical, logical, or other distinction between KV stores.

Any of the KV stores described herein may be implemented with any suitable arrangement of resources. For example, in some embodiments, any of the lower KV stores 202 illustrated in FIG. 2 may be implemented with one or more hardware KV devices such as devices 110 illustrated in FIG. 1, in which case, an interface 204 may correspond to the interface 104. In other embodiments, however, any of the upper KV stores 200 and/or lower KV stores 202 may be implemented with virtualized storage, a storage area network (SAN), storage as a service (STasS), software defined storage (SDS), and/or any other type of flexible and/or on-demand storage infrastructure.

Although the deployment module 208 may be described above as implementing a conversion strategy at deployment, a deployment module and/or KV adapter according to this disclosure may implement a conversion strategy after deployment or at any other suitable time, for example, to adjust to changing conditions such as resource availability, workload demands, user configuration preferences, etc. Also, in some embodiments, KV stores may be adapted on a "per I/O" basis as well as a "per deployment" basis.

The key-value adapter 206 may further include additional features, for example, functionality for snapshots, concurrency, and/or version support as described below.

Figure 4:
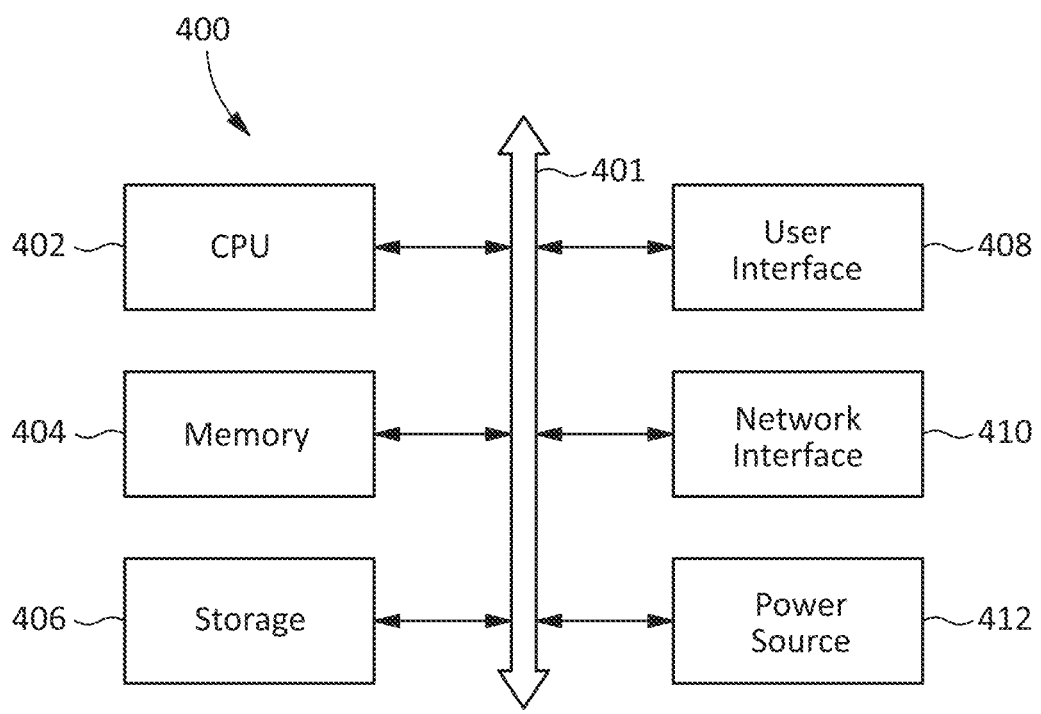
FIG. 4 illustrates an embodiment of a computing system according to this disclosure.

FIG. 4 illustrates an embodiment of a computing system according to this disclosure. The system 400 of FIG. 4 may be used to implement any or all of the methods and/or apparatus described in this disclosure. The system 400 may include a central processing unit (CPU) 402, memory 404, storage 406, a user interface 408, a network interface 410, and a power source 412, all of which may be interconnected with a system bus 401. Moreover, the principles of this disclosure are not limited to implementation with any of the components illustrated in FIG. 4 but may be realized with any suitable hardware, software or combinations thereof. In some embodiments, any or all of the components may be realized in a virtualized form and/or in a cloud-based implementation with flexible provisioning of resources, for example within a data center, or distributed throughout multiple data centers. In different embodiments, the system may omit any of these components or may include duplicates, or any additional numbers, of any of the components, as well as any other types of components to implement any of the methods and/or apparatus described in this disclosure.

The blocks, steps or items of a method or algorithm and functions described in connection with the embodiments disclosed herein may be embodied directly in hardware, in one or more software modules executed by a processor, or in a combination of the two, including in the system 400. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium, Any system disclosed herein, or component or portion thereof, may be implemented as a part of a software stack of a larger system, as part of a key-value stack of a larger system. Any system disclosed herein, or component or portion thereof, may be implemented as its own software stack.

2. Problem Formulation 2.1 Modeling a Single Key-Value Store

Figures 5, 6:
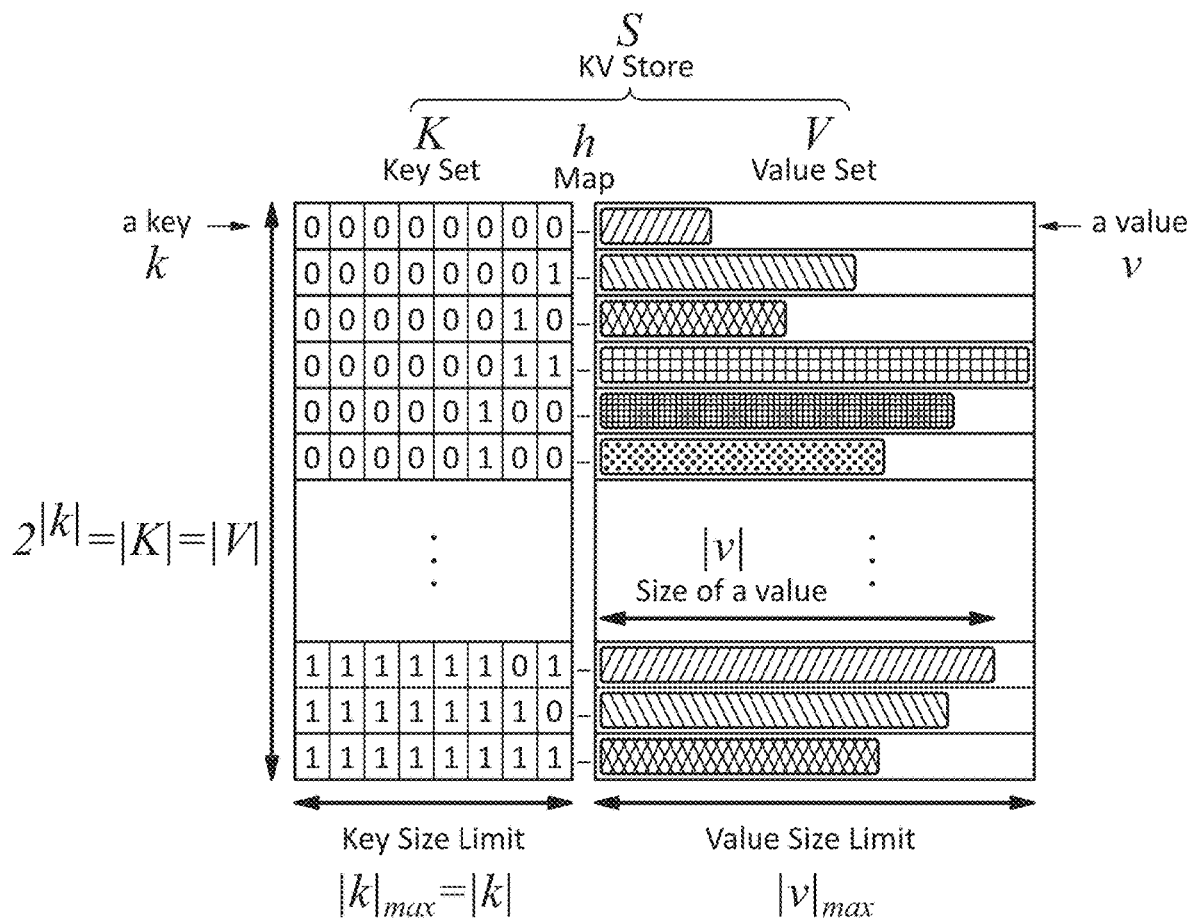
FIG. 5 illustrates an embodiment of a model for a key-value store according to this disclosure.
FIG. 6 illustrates an embodiment of a model of key-value pairs for two different key-value stores according to this disclosure.

FIG. 5 illustrates an embodiment of a model for a key-value (KV) store according to this disclosure. Table 2-1 describes some example symbols, terminology, and the like that may be used in conjunction with this model and other embodiments throughout this disclosure. These symbols, terminology, and the like, however, may not be limited to the descriptions provided in Table 2-1 or elsewhere in this disclosure, and the terminology may have different meanings depending on context, including in the context of different embodiments. The model illustrated in FIG. 2-1 may be used to model different key-value stores which may be implemented with different specifications. This embodiment may often enable the modeling of different key-value stores having different specifications in a straightforward and unified manner.

Referring to FIG. 5 and Table 2-1, a key-value store may have a Key Set (denoted as K, which may contain all keys) and a Value Set (denoted as V, which may contain all values).

Since keys and values may have a 1-to-1 pairing (surjective or bijective mapping), the number of keys in the Key Set (i.e., |K| the size of the Key Set) may be the same as the number of values in the Value Set (i.e., |V|, the size of Value Set).

In some embodiments, binarized keys may be used, in which case the actual size of each key k and value v may be represented as |k| and |v|, respectively. Binarized keys may be used, for example, to simplify a problem formulation because keys may have different formats in different key-value store implementations. For example, key-value stores may use non-binary key formats such as strings, documents, collections, and various other formats and/or combinations thereof. Converting non-binary keys to a binary code as shown in FIG. 5, for example, may make it easier to determine the actual size and/or range of a key. Thus, in some embodiments that use binarized keys, the binarized identification (ID) of a key may be more relevant than the string or other format of the original key.

In a specific key-value store implementation, each key and/or value may have a preset length limit denoted as $|k|_{max}$ and $|v|_{max}$, respectively.

Some user key-value stores have binary-based key set space size limitations. For example, Redis may support up to $2^{32}=4,294,967,296$ keys, which provides a binarized key space from 0,000,000,000,000,000,000,000 to 1,111,111, 111,111,111,111,111. Thus, the actual key size |k| may be the same as the key length limit $|k|_{max}$, i.e., $2^{|k|}=|K|=|V|$.

Relationship 1: Mapping within a KV Store

In some embodiments, within a KV store, each key may be paired with only one value and vice versa. This may be referred to as a surjective or bijective mapping relationship as shown in Eq. 2-1:

$$h: K \underset{1:1}{\leftrightarrow} V \quad \text{(Eq. 2-1)}$$

where h may be a mapping function to build the 1:1 relationship between key-value pairs, K may be the key set, and V may be the value set. In other words, for each key k in some embodiments of a key-value store, there may exist only one value that is paired with the key k as shown in Eq. 2-2.

$$\forall k \in K, \exists ! v \leftarrow h[k] \quad \text{(Eq. 2-2)}$$

The value V of a key-value pair may be accessed by calling the map function h using the corresponding key k as an input to the map function h. This accessing operation may be denoted as "←h[k]" in Eq. 2-2. The map function h may be implemented, for example, with one or more hash functions which are commonly used to build mapping relationships between key-value pairs in KV stores.

In other embodiments, the relationship between key-value pairs and/or mapping of the hash function may not be 1:1, but such embodiments may include collision resolution techniques and/or other measures that provide a practical implementation of a KV store.

Some of the fundamental operations performed on values in a key-value store include get, put, delete, and update. The table titled Algorithm 2-1 illustrates some example pseudo-code for some APIs and basic implementations of these fundamental operations, or procedures, in a KV store according to this disclosure.

2.2 Modeling Multiple Key-Value Stores

FIG. 6 illustrates an embodiment of a model of key-value pairs for two different key-value stores according to this disclosure. For purposes of illustration, the upper key-value store may be referred to as a "User" key-value store, and the associated components, symbols, pseudocodes, and other references to the upper KV store may be designated as "user" or "U". Similarly, the lower key-value store may be referred to variously as a "Device" or "Internal" or "device internal" key-value store, and the associated components, symbols, pseudocodes, and other references to the lower store may be designated as "device", "internal, "device internal" or "I". These designations, however, are only for convenience and may enable some embodiments to be described in the context of one possible type of implementation. The principles of this disclosure are not limited to methods, systems, apparatus, etc., having these designations. Moreover, even though some embodiments are described in the context of a single upper key-value store and a single lower key-value store, the principles of this disclosure may enable any number of upper key-value stores to be adapted to any number of lower key-value stores.

Referring to FIG. 6, although the upper and lower keys and values are shown graphically as having specific sizes, limits, and the like, the principles of this disclosure may be applied to any two or more different KV stores having specifications that are the same or different in terms of any of their key and/or value set sizes, key and/or value length limits, binarization scheme, and/or any other parameters, characteristics, or the like.

In the example illustrated in FIG. 6, the user KV store may have a different key space size and value length limit than the device KV store. Specifically, the user KV store may have fewer keys than the device KV store, and the maximum value size for the user KV store may also be less than maximum value size for the device KV store. The key space size may be related, for example, to a binarized key length limit as mentioned above. Examples of embodiments having a range of different specifications are described below.

Table 2-2 describes some example symbols, terminology, and the like that may be used in conjunction with this model and other embodiments throughout this disclosure. These symbols, terminology, and the like, however, may not be limited to the descriptions provided in Table 2-2 or elsewhere in this disclosure, and the terminology may have different meanings depending on context, including in the context of different embodiments.

Figure 7:
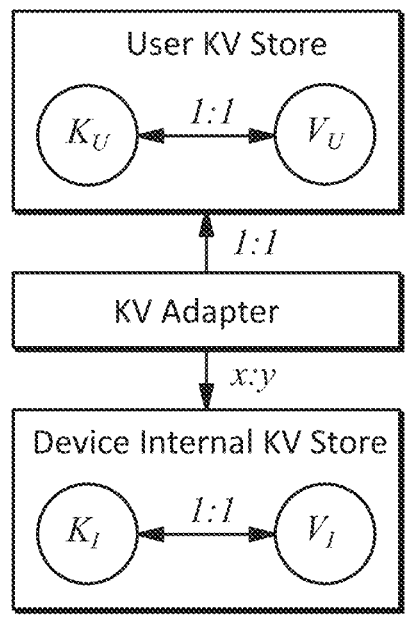
FIG. 7 illustrates an embodiment of a KV adapter according to this disclosure.

FIG. 7 illustrates how an embodiment of a KV adapter according to this disclosure may adapt two KV stores. The upper or user KV store may have different specifications than the lower or device KV store. For example, the user and device KV stores may have different sizes of key length and/or value length. The KV adapter may enable the user KV store to seamlessly and/or transparently store user KV pairs in the device KV store.

As shown in FIG. 7, there may be a 1:1 mapping between keys and values in the user KV store, and a 1:1 mapping between keys and values in the device KV store. But there may not be a 1:1 mapping from the user KV store to the device KV store because the user KV store and device KV store may have different specifications. For example, there may be an x:y mapping from the user KV store to the device KV store. In some embodiments, however, the KV adapter may enable the mapping to appear as 1:1 from the perspective of the user KV store. For example, the adapter may implement the x:y mapping "underneath" the KV adapter or between the KV adapter and the device KV store while providing a virtual mapping to the user KV store. In some embodiments, the adapter may be able to automatically translate, remap, or fill the gap between KV stores having different specifications and or mappings over a range of different cases.

In some embodiments, a KV adapter according to this disclosure may include deployment functionality that may enable the adapter to be set up, arranged or otherwise configured based on the specifications of multiple KV stores during the deployment of one or more of the KV stores. In some embodiments, the KV adapter may determine an adapting strategy (also referred to as a conversion strategy) based on the specifications during deployment. The KV adapter may also include on-the-fly (OTF) or run-time functionality that may enable the KV adapter to use the adapting strategy to enable key-value pair operations on-the-fly after deployment.

In some embodiments, a KV adapter may have a strategy selection with deployment granularity based on "per KV store deployment", That is, strategy determination may be conducted essentially at or near deployment of one or more KV stores. After a KV store is deployed, the KV adapter may conduct operations on-the-fly at a granularity level of "per user KV pair" which may be transparent to the user KV store. In other embodiments, a KV adapter may have different levels of granularity for configuration and/or operation. For example, a KV adapter may determine and/or update an adapting strategy after deployment, for example, to adjust to changes in one or more of the KV stores.

Relationship 2: Mapping Between Multiple KV Stores

In some embodiments, a surjective or bijective mapping may be established between two KV stores such that, for each KV pair in the user KV store (i.e., $(k_U, v_U)$), there may exist only one set of KV pair(s) in the device store (i.e., $(k_{I_i}, v_{I_i<\theta_L,\theta_H>})$) that may be used to store the value content of the corresponding KV pair from the user KV store. For each device KV pair in the mapped set of device KV pairs underneath the adapter, data may be stored in the entire value of the device KV pair or a partial section of the value of the device KV pair. Thus, in Eq. 2-3 below, $v_{I_i<\theta_L,\theta_H>}$ may refer to that value in the range of two offsets $\theta_L$ and $\theta_H$ where $0 \leq \theta_L < \theta_H < |v_I|_{max}$.

A mapping procedure may be conducted by a mapping function $f(S_U, S_I)$ where the input $S_U$ may represent a user KV store, and the input $S_I$ may represent a device KV store. The function $f$ may return a set of i (that is, $i \in \{f(S_U, S_I)\}$), and these "i"s may be in the range of the device key space (that is, $i \in [0, |K_I|)$).

$$\forall (k_U, v_U) \in S_U, \quad \text{(Eq. 2-3)}$$
$$\exists ! (k_U, v_U) \underset{1:1}{\leftrightarrow}$$
$$\{(k_{I_i}, v_{I_i} < \theta_L, \theta_H >) | i \in [0, |K_I|) \cap i \in \{f(S_U, S_I)\},$$
$$0 \leq \theta_L < \theta_H < |v_I|_{max}\}$$

In some embodiments, a KV adapter according to this disclosure may find or construct an adapting function $f(S_U, S_I)$ for multiple different cases during deployment of multiple KV stores. In some embodiments, a KV adapter may find or construct an adapting function that may accommodate all possible given cases during deployment.

Referring again to Eq. 2-3, one characteristic of mapping between multiple KV stores may be a mapping relationship from one user KV pair to a set of device KV pairs. Specifying a "set of device KV pairs" may reflect an arrangement in which, underneath the adapter, one user KV pair may be mapped to one or multiple device KV pairs. This may also reflect that the returned set size in Eq. 2-3 is from 1 (i.e., one user KV pair being mapped to 1 device KV pair) to the maximum number of max keys (i.e., an extreme case in which one KV is mapped to all available KV pairs).

Another characteristic of mapping between multiple KV stores as set forth in Eq. 2-3 is that, in some cases, multiple user KV pairs may be stored in the value slot of a single device KV pair. This may be implemented, for example, by using one or two different offsets to indicate the position of the user value within the value slot of the device KV pair.

Thus, in some embodiments, a KV adapter may present a transparent API to a user KV store that may cause the device KV store underneath the adapter to appear to the user KV store to have the same or similar specifications as the user KV store.

This may also be seen from the table titled Algorithm 2-2 which illustrates examples of pseudocode APIs that may be exposed to a user KV store by a KV adapter according to this disclosure. These APIs may implement fundamental KV store operations or procedures such as get, put, delete and/or update.

Eq. 2-3 includes a 1:1 relationship, but in other embodiments, the relationship may not be 1:1, in which case additional techniques such as corrective mappings, collision resolution, and the like, may be employed to provide a practical implementation of a KV store adapter.

In some embodiments, a KV adapter according to this disclosure may provide one or more different implementations of one or more adapting functions $f(S_U, S_I)$ for multiple different cases during deployment of multiple KV stores. In some embodiments, a KV adapter may find or construct an adapting function that may accommodate all possible given cases during deployment.

3. Function f: Main Adapting Function

In some embodiments, the principles of this disclosure may provide a method for building an adapting function $f(S_U, S_I)$ which may be implemented in three major parts:

Part 1 (Function g): may select a strategy based on the specifications of two given KV stores;

Part 2 (Function c): may convert a device internal KV store to a converted device internal KV store (also referred to as a converted KV store) based on the strategy selected in Part 1; and Part 3 (Function m): may conduct a final mapping between the user KV store and the converted device internal KV store. As an example, the final mapping may be implemented as a 1:1 mapping, but the principles of this disclosure encompass other types of final mapping.

These three parts may be reflected in Eq. 3-1 in which the functional expressions may appear to be in reverse order to illustrate the progressive expansion of each function.

$$f(S_U, S_I) = m(S_U, S'_I) \quad \text{(Eq. 3-1)}$$
$$= m(S_U, c(S_I, \omega))$$
$$= m(S_U, c(S_I, g(S_U, S_I)))$$

Table 3-1 describes some example symbols, terminology, and the like that may be used in conjunction with Eq. 3-1 and other equations and embodiments throughout this disclosure. These symbols, terminology, and the like, however, may not be limited to the descriptions provided in Table 3-1 or elsewhere in this disclosure, and the terminology may have different meanings depending on context.

Although the principles of this disclosure are not limited to any particular embodiment or implementation, some embodiments and/or implementation details are described through this disclosure in the context of a software structure having a class named UnivKVAdapter. As used herein, "universal" or "univ" may refer to an ability to adapt multiple types of upper KV stores to at least one type of lower KV store or vice versa and may not necessarily imply the ability to adapt between every type of KV store in every case.

The table titled Algorithm 3-1 illustrates some example pseudocode that may be used to implement a main KV adapting function according to this disclosure.

Figure 8:
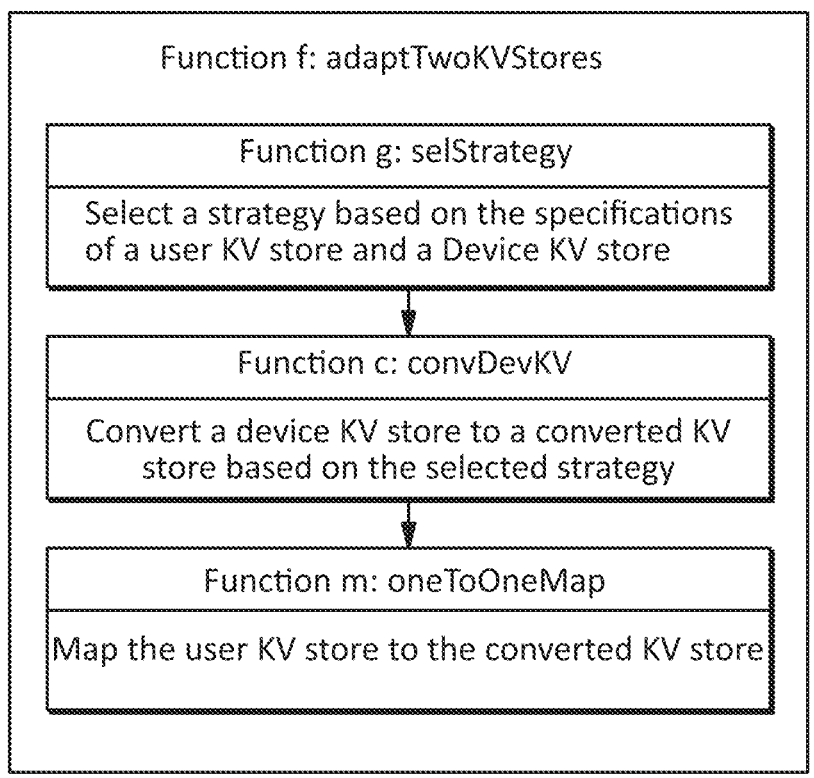
FIG. 8 illustrates an example embodiment of a workflow module for a main KV adapting function according to this disclosure.

FIG. 8 illustrates an example embodiment of a workflow module for a main KV adapting function according to this disclosure.

Referring to Algorithm 3-1, the "main function" of the (class) UnivKVAdapter is named "adaptTwoKVStores" (i.e., function f, $f(S_U, S_I)$) and may have at least two inputs: userKVStore (i.e., $S_U$) and devKVStore (i.e., $S_I$).

UnivKVAdapter may first select an adapting strategy by calling "selStrategy" (i.e., function g, $\omega = g(S_U, S_I)$) based on the specifications of the two input KV stores such as key set space size and/or value size limit. The UnivKVAdapter may then convert the given device internal KV store using the selected strategy (i.e., function c, $S_I' = c(S_I, \omega)$) by calling "convDevKV".

Thus, the UnivKVAdapter may hide the internal mapping procedure and expose an API for a converted device internal KV store to the user KV store.

In some embodiments, a conversion operation may result in a single KV pair from a user KV store being stored in multiple KV pairs of a device internal KV store. In some other embodiments, a conversion operation may result in multiple KV pairs from a user KV store being stored in a single KV pair in a device internal KV store. In yet other embodiments, a conversion operation may result in the capacity of the device internal KV store being increased or scaled out to support the user KV store—for example, one or more storage devices may be added, and a cross-device virtual logic volume (possibly with an extended address range) may be created. Some embodiments may support all or any combination of these examples in a KV adapter according to this disclosure.

After the conversion operation, UnivKVAdapter may call "oneToOneMap" (i.e., function m, $m(S_U, S_I')$) to conduct a final mapping between the user KV store and the converted device internal KV store. The final mapping may be implemented as a 1:1 mapping if, for example, the conversion operation resulted in the two KV stores having the same key set space size and the length limit of the user KV store is less than or equal to that of the converted device internal KV store. However, other types of mapping may be used, for example, in conjunction with other types of conversion operations.

4. Function g: Strategy Selection

In some embodiments, one or more sets of conditions may be used to differentiate between different conversion cases and thereby guide the strategy selection process. Some example embodiments are described below in the context of methods and systems in which two sets of conditions may be used to determine which strategy to use for adapting an upper KV store to a lower KV store. The principles of this disclosure, however, are not limited to the use of any specific numbers, sets, or types of conditions to determine an adapting or conversion strategy.

Table 4-1 sets forth an array of cases that may be used to select a strategy for adapting a user KV store to a device internal KV store based on a set of base conditions and a set of extra conditions according to this disclosure. The base conditions may be referred to as "BsCon", and the extra conditions may be referred to as "ExCon". Table 4-1 also describes some relationships such as equations (or inequations) that may be used to determine the base conditions according to this disclosure. Table 4-2 describes some example relationships such as equations (or inequations), and the like that may be used to determine some extra conditions according to this disclosure. Tables 4-1 and 4-2 also describe some possible conversion strategies that may be used based on the various conditions. The information including the cases and/or conditions and/or relationships described in the context of Table 4-1 and 4-2 are provided for purposes of illustration and may be used, for example, as part of a strategy selection system that compares the capacity of a device KV store to the demand of a user KV store. Moreover, Table 4-1 also provides references to sections of the disclosure that provide example implementation details for the various conversion strategies. These references are provided as a convenience to illustrating the example embodiments described in the context of Tables 4-1 and 4-2, but the conditions, conversion cases, and/or strategies and the like described in the context of Tables 4-1 and 4-2 are not limited to the examples referenced in the table.

4.1 Base Conditions

One qualification criteria for determining if a given device internal KV store may be able to support a given user KV store may be to determine whether the device internal KV store has enough key set space and/or value length limit to accommodate the user KV store. In some embodiments, this may be accomplished, for example, by comparing the key set space size ($|K_U|$, $|K_I|$) and the value length limit ($|v_U|_{max}$, $|v_I|_{max}$) of the user KV store and the device internal KV store respectively, and listing the possible combinations as shown in Table 4-1.

In Table 4-1, BsCon1_, BsCon2_, and BsCon_3 may refer to the conditions $|K_U|<|K_I|$, $|K_U|=|K_I|$, and $|K_U|>|K_I|$, respectively, while BsCon_1, BsCon_2, and BsCon_3 may refer to the conditions $|v_U|_{max}<|v_I|_{max}$, $|v_U|_{max}=|v_I|_{max}$, and $|v_U|_{max}>|v_I|_{max}$, respectively.

The notation "ConX_" and "Con_Y" may be used as shown in Table 4-1 to represent row X of base conditions and column Y of base conditions, and the combination "ConXY" may refer to the cell at the intersection of row X and column Y to refer to different cases based on the different combinations of base conditions of key set space size and maximum value length limit. For example, "Con1_" may refer to row 1 and "Con_2" is column 2, and thus "Con12" may refer to the cell at row 1 and column 2 of base conditions (case 3 in the table).

Also, "==T" and "==F" may represent the logic values "is true" and "is false", respectively.

Thus, nine different base cases (i.e., BsCon11 to BsCon33) may be listed based on the nine different combinations of "ConXY"s.

In some embodiments, using these or other base conditions to determine up to nine cases or any other number of cases may provide an adequate foundation for determining a conversion strategy. In some other embodiments, the base conditions may be supplemented with extra conditions to further divide one or more of the cells determined by the base conditions.

4.2 Extra Conditions

One example of an extra condition is a determination of whether the total capacity of the user KV store is less than or equal to that of the device internal KV store. This may be determined, for example, by comparing the product of the key set space size and the value size limit for each KV store, i.e., $|K_U| \times |v_U|_{max}$ and $|K_I| \times |v_I|_{max}$. These products may indicate the maximum amount of data that may be stored in a user KV store or a device KV store (i.e., the total capacity of a KV store). An example of such an extra condition is designated as ExCon1 as shown in Table 4-2 and used in Table 4-1.

An extra condition such as ExCon1 that compares the product of the key set space size and the value size limit for each KV store may be useful, for example, in situations where the base conditions may not be able to accurately and/or comprehensively reflect the total capacity of each KV store, for example, where the base conditions may only evaluate one type of resource (e.g., key set space size or value size limit) at a time.

In some embodiments, an extra condition such as ExCon1 may be described as a "necessary and sufficient condition" that may indicate the lowest capacity requirement for the device internal KV store to support the user KV store without any "resource borrowing" such as packing or sharding as described below. However, the term "necessary" may not imply that the condition is necessary in any absolute sense. Rather, the term "necessary" may only imply a necessity or desirability within the context of a specific scheme for determining a conversion case.

Two additional examples of extra conditions relate to determining whether adequate resources may be borrowed within a device internal KV store to accommodate a resource borrowing function such as packing or sharding. These types of extra conditions may determine, for example, whether one type of resource (e.g., the key set space size) of a device internal KV store is less than that of the user KV store, while the other type of resource (e.g., the value size limit) is greater than that of the user KV store. Examples are ExCon2 and ExCon 3 as shown in Table 4-2.

ExCon2 may determine whether the device internal key-value store can borrow adequate key space from its value space (value-to-key or "V2K") to implement a resource borrowing function. ExCon3 may determine whether the device internal key-value store can borrow adequate value space from its key space (key-to-value or "K2V") to implement a resource borrowing function. In some embodiments, an extra condition such as ExCon2 and ExCon3 may be described as a "necessary but not sufficient condition" for resource borrowing which may be used in conjunction with other conditions such as ExCon1. Again, the term "necessary" may not imply that the condition is necessary in any absolute sense. Rather, the term "necessary" may only imply a necessity or desirability within the context of a specific scheme for determining a conversion case.

Another example of an extra condition may be a composite condition that combines determination of other base and/or extra conditions. An example of such a condition is ExCon4 which, as shown in Table 4-2, may be considered true if all of ExCon1, ExCon2 and ExCon3 are false. ExCon4 may be used to determine, for example, that it may not be possible, feasible, and/or desirable for the device internal KV store to support the user KV store without scaling out to add more storage capacity.

Thus, in the example cases illustrated in Table 4-1, some of the nine cells representing base cases determined with the base conditions may be further divided using extra conditions to provide a total of 11 cases. In other embodiments, however, different base and/or extra conditions may be used to provide any number of cases that may be used to determine a conversion strategy according to this disclosure, Depending on the implementation details, an embodiment of a KV adapter may be able to find a suitable conversion strategy for all possible conversion cases.

4.3 Strategy Selection for Different Cases

Referring to Table 4-1, the different conversion Cases 1-11 may be associated into different groups and/or categories based on the conditions and/or resulting conversion strategies.

Category 1—Directly Use (Cases 1, 2, 3 and 4)

A case may fall into Category 1 if, for example, the user KV store may be adapted to the device internal KV store without the device internal KV store needing to borrow resources or scale out. For example, the demands of the user KV store may not exceed the resources of the device internal KV store in terms of key set space size (i.e., $|K_U|$ relative to $|K_I|$), value length limit (i.e., $|v_U|_{max}$ relative to $|v_I|_{max}$), and total capacity of the KV store (i.e., $|K_U| \times |v_U|_{max}$ relative to $|K_I| \times |v_I|_{max}$).

With conversion cases in Category 1, a conversion strategy may be to "Directly Use" (DU) the device internal KV store as the converted KV store "as-is" without any significant modifications.

In an embodiment according to Table 4-1, Cases 1, 2, 3 and 4 may inherently satisfy the conditions BsCon11, BsCon21, BsCon12, and BsCon22, respectively, if they satisfy ExCon1. That is, depending on the implementation, BsCon11, BsCon21, BsCon12, and BsCon22 may be subsets of ExCon1. Nonetheless, it may still be beneficial to distinguish between these four cases (e.g., using the expression BsCon__==T && ExCon1==T) for multiple reasons. First, in a software implementation of the strategy selection function g ($\omega=g(S_U,S_I)$), other cases (i.e., cells) in other categories such as Cases 5 through 11 may need to conduct the && operation with other base conditions (BsCon__) and/or extra conditions (ExCon_). It may be more efficient to simply have every case perform the && operation, even thought it may not be needed, than to perform a logical check to see if the && operation is needed. Second, in other embodiments, there may be different conversion and/or mapping strategies that may be implemented depending on the state of the base conditions (BsCon__) even if ExCon1 is satisfied.

Category 2—Borrow Resources (Cases 5 and 6)

A case may fall into Category 2 if, for example, either the key set space size or the value size limit of the user KV store is greater than that of the device internal KV store (i.e., either BsCon13 or BsCon31 is true), but the total capacity of the user KV store does not exceed that of the device internal KV store (i.e., ExCon1 is true), and the device internal KV store has adequate resources to borrow internally. Resources may be borrowed, for example, from value-to-key (V2K) if ExCon2 is true, or from key-to value (K2V) if ExCon3 is true.

With conversion cases in Category 2, a conversion strategy may be to convert the device internal KV store to a converted KV store which appears transparent to the user KV store, but underneath the adapter, the device internal KV store borrows resources internally using, for example a packing function or a sharding function.

Category 3—Scale Out (Cases 7, 8, 9, 10, and 11)

A case may fall into Category 3, for example, if the device internal KV store does not have enough total capacity to support the demand of the user KV store, even by borrowing resources. With conversion cases in Category 3, a conversion strategy may be to scale out (SO) the device internal KV store, for example, by adding one or more additional storage devices and/or by building an Extended Centralized Virtual Key Value Space (ExtKV) to enable the device internal KV store to support the user KV store.

A conversion strategy that involves scaling out may also be combined with one or more other strategies. For example, in some deployments, after scaling out the device internal KV store, the adapter may directly use (DU) the scaled device internal KV store as the converted KV store. In some other deployments, the scaled out device internal KV store may implement a resource borrowing function for the converted KV store.

Figure 9:
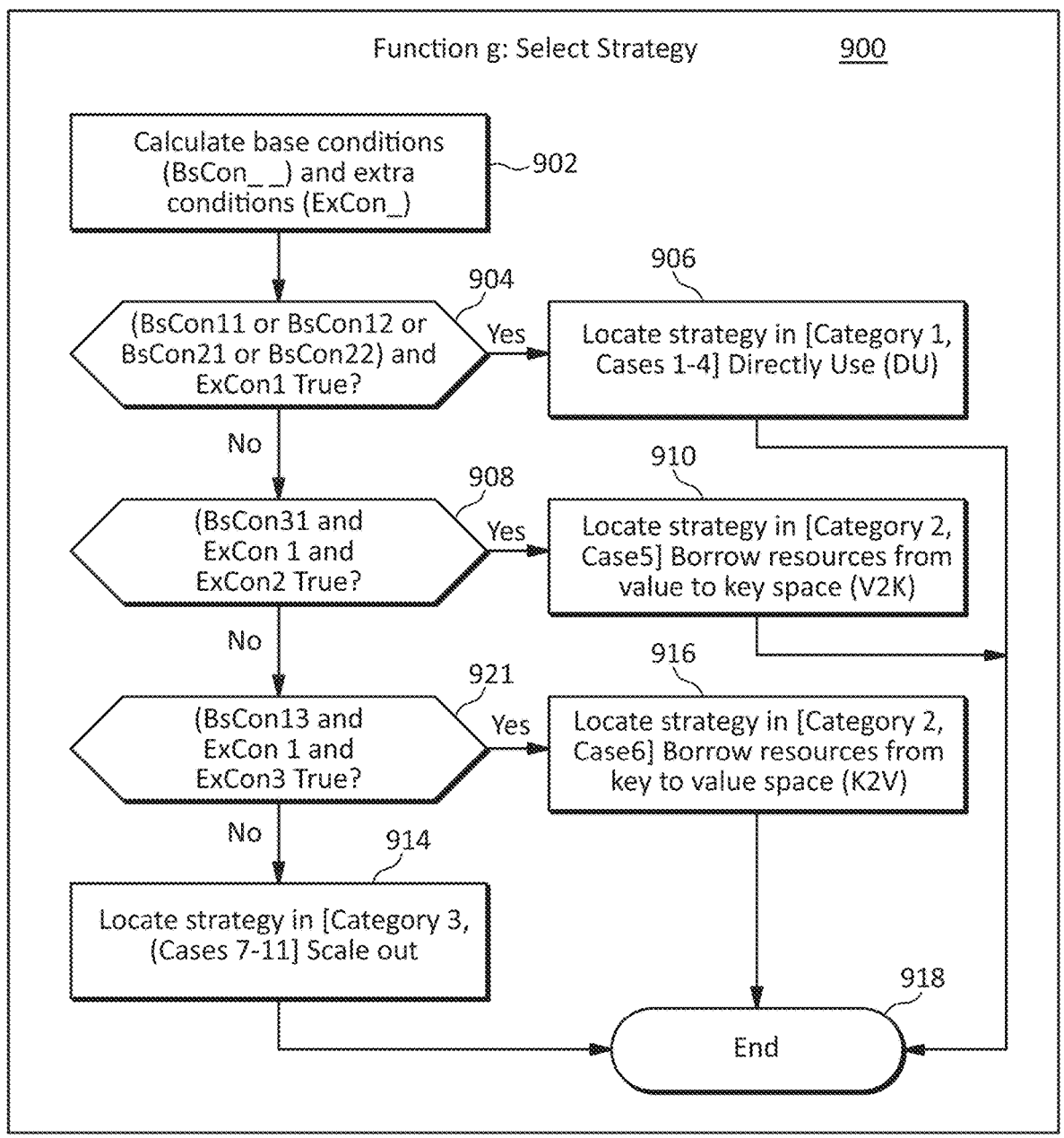
FIG. 9 illustrates an example embodiment of a workflow module for a strategy selection function according to this disclosure.

FIG. 9 illustrates an example embodiment of a workflow module for a strategy selection function according to this disclosure. The workflow 900 begins at item 902 by calculating the base conditions (BsCon__) and extra conditions (ExCon__). At item 902, the workflow checks the conditions for Category 1. If the conditions for Category 1 are True, the workflow proceeds to item 906 and locates the strategy in Category 1, (one of Cases 1-4) before terminating at item 918. Otherwise, at item 908, the workflow checks the conditions for Category 2, Case 5. If the conditions for Category 2, Case 5 are True, the workflow locates the strategy in item 910 before terminating at item 918. Otherwise, at item 921, the workflow checks the conditions for Category 2, Case 6. If the conditions for Category 2, Case 6 are True, the workflow locates the strategy in item 916 before terminating at item 918. Otherwise, the workflow locates the strategy in Category 3 (one of Cases 9-11) in item 914 before terminating at item 918.

The table titled Algorithm 4-1 illustrates some example pseudocode that may be used to implement a strategy selection and/or switching function according to this disclosure.

5. Function c: Device Internal KV Store Conversion

Once a conversion strategy is selected, for example, during deployment or to adjust to changing resources, the strategy may be used to convert a device internal KV store into a converted KV store. Table 5-1 summarizes some conversion strategies that may be used for various categories of conversion cases according to this disclosure. Some of the categories may be further divided into subcategories depending on the details of conversion strategy for each case. Thus, in an example embodiment implemented according to Table 5-1, there may be a total of six overall conversion strategies. In other embodiments, however, there may be different numbers of strategies. Moreover, for purposes of illustration, the function c is described in the context of a device internal KV store, but the principles described in this section are also applicable to any other type of lower KV store, regardless of implementation, 5.1 Category 1: Directly Use For cases in Category 1, both the key set space size and value size limit of the user KV store may be less than or equal to those of the device internal KV store, Thus, for Cases 1, 2, 3 and 4, the adapter may "directly use" the device internal KV store as the converted KV store without borrowing resources (e.g., sharding or packing key/value spaces or scaling out such as adding more storage devices).

Figure 10:
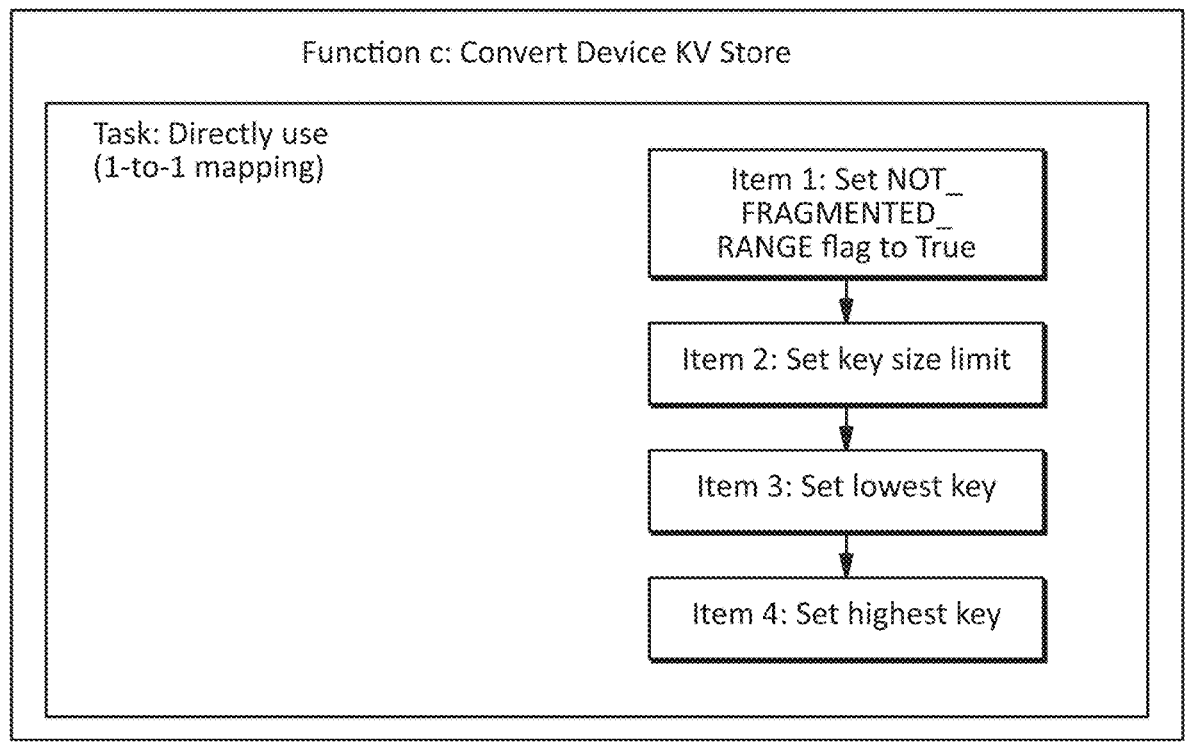
FIG. 10 illustrates an embodiment of a workflow module for converting a device KV store according to this disclosure.
Figure 11:
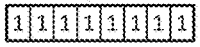
Figure 13:
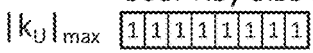
Figure 14:
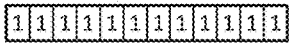

FIG. 10 illustrates an embodiment of a workflow module for converting a device KV store to a converted KV store with a directly use (DU) conversion strategy according to this disclosure. The embodiment illustrated in FIG. 10 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges. The table titled Algorithm 5-1 illustrates some example pseudocode that may be used to implement a directly use (DU) conversion strategy according to this disclosure.

Referring to FIG. 10 and Algorithm 5-1, beginning at Item 1, a "NOT_FRAGMENTED_RANGE" flag in convDevKV-Store may be set to True. This flag may be used in function m to qualify whether the range is fragmented or not. At Item 2, the key size limit of the converted KV store (convDevKV-Store) is set. This may enable the function m to determine the total (e.g., binary) key length of the converted KV store. In this embodiment, the key size limit of the converted KV store may be set to the key size limit of the device KV store, but in other embodiments, it may be set to another suitable value, for example, to the key size limit of the user KV store if it is less than the key size limit of the device KV store.

At Item 3, the lowest key (i.e., very first key) of the converted KV store (convDevKVStore) may be set. The lowest key may be set, for example, to a default value of the very first key of the given device KV store (i.e., devKV-Store.getLowestKey( )).

At Item 4, the highest key (i.e., the very last key) of the converted KV store (convDevKVStore) may be set. The highest key may be determined, for example, by adding the number of keys in the user KV store (i.e., userKV-Store.getHighestKey( )–userKVStore.getLowestKey( )) to the lowest key in the converted KV store.

FIGS. 11, 12, 13, and 14 illustrate example embodiments of processes for converting a device KV store to a converted KV store based on a directly use (DU) type of conversion strategy such as those for Cases 1, 2, 3 and 4, respectively. In each of FIGS. 11, 12, 13, and 14, the top cell on the right may include one or more expressions for base conditions and/or extra conditions for the case such as those described above with respect to Tables 4-1 and 4-2. The middle cell on the right may provide a graphical representation, not necessarily to scale, of the relative sizes of a user key size limit and a device key size limit, and the relative sizes of a user value size limit and a device value size limit. The symbols Π and Λ may represent the mathematical operators = and >, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a device KV store based on the conversion strategy for the specific case.

5.2 Category 2: Borrow Resources

For cases in Category 2, either the key set space of the device KV store may be smaller than that of the user KV store, or the value size limit of the device KV store may be smaller than that of the user KV store, but the device KV store may still have enough capacity to support the user KV store by borrowing between different types of resources within the device KV store. Resource borrowing may be used, for example, in Cases 5 and 6 in Category 2.

5.2.1 Case 5: Borrow Resources from Value to Key (Packing)

In Case 5, a user key set space size may be larger than a device key set space size, but the user value size limit may be smaller than the device value size limit, and ExCon2 may be true. Thus, the KV adapter may borrow resources from value-to-key or V2K. Borrowing resources from value-to-key may be implemented, for example, with a packing operation or function in which multiple user KV pairs may be stored in a smaller number of device value slots. In some embodiments, multiple user KV pairs may be packed into a single device value slot, in which case it may be referred to as "x-to-1 packing". In other embodiments, multiple user KV pairs may be packed into multiple device value slots, i.e., "x-to-y packing" in any ratio of x:y that may be suitable for borrowing resources within the device KV store.

Figure 15:
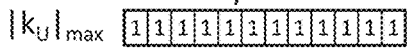
FIG. 15 illustrates an example embodiment of a process for converting a device KV store to a converted KV store using a value packing type of resource borrowing strategy according to this disclosure.

FIG. 15 illustrates an example embodiment of a process for converting a device KV store to a converted KV store using a value packing type of resource borrowing strategy that may be used for Case 5 according to this disclosure. The top cell on the right of FIG. 15 may include one or more expressions for base conditions and/or extra conditions such as those described above with respect to Tables 4-1 and 4-2. The middle cell on the right may provide a graphical representation, not necessarily to scale, of the relative sizes of a user key size limit and a device key size limit, and the relative sizes of a user value size limit and a device value size limit. The symbols $\wedge$ and $\vee$ may represent the mathematical operators < and >, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a device KV store based on the conversion strategy for the specific case.

Figure 16:
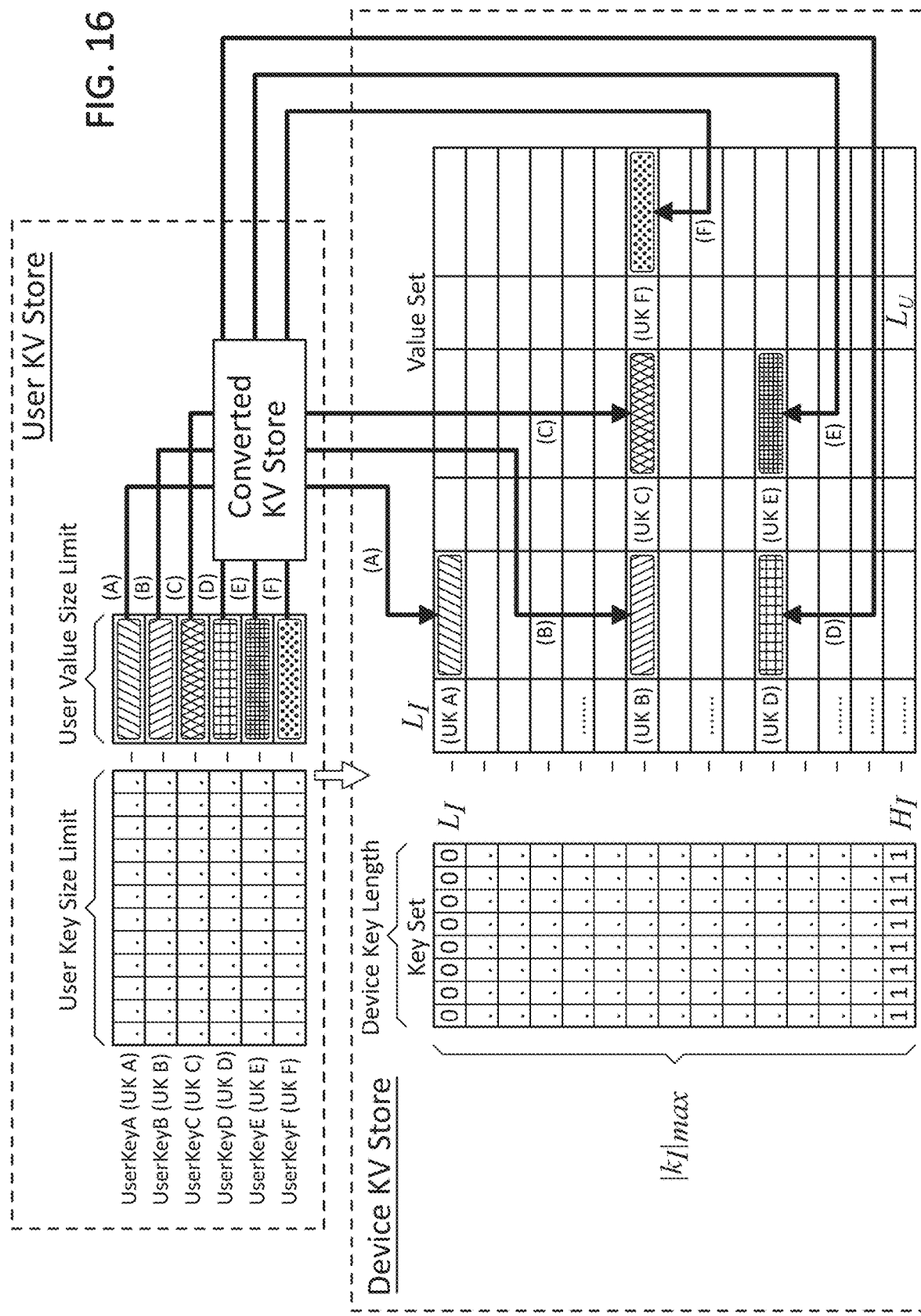
FIG. 16 illustrates an example embodiment of a conversion mapping according to this disclosure.

FIG. 16 illustrates an example embodiment of a conversion mapping from keys and values of a user KV store to keys and values of a device KV store through a converted KV store (convDevKVStore) according to this disclosure.

Figure 17:
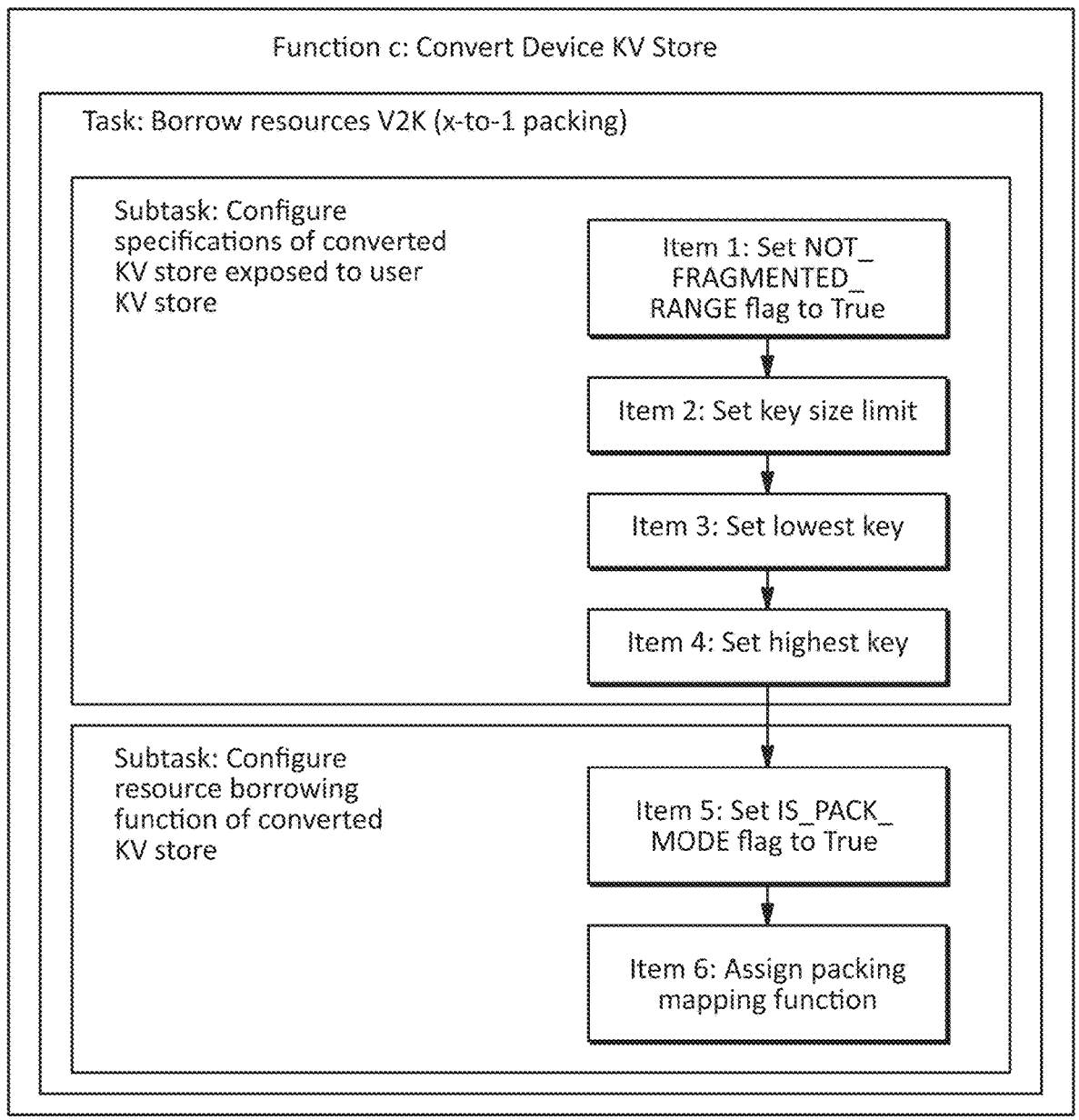
FIG. 17 illustrates an example embodiment of a workflow module for converting a device KV store to a converted KV store using a conversion strategy with packing resource borrowing according to this disclosure.

FIG. 17 illustrates an example embodiment of a workflow module for converting a device KV store to a converted KV store using a conversion strategy with V2K resource borrowing according to this disclosure. The embodiment illustrated in FIG. 17 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges.

Table 5-2 describes some example symbols, terminology, and the like that may be used in conjunction with the embodiments described for Case 5. These symbols, terminology, and the like, however, may not be limited to the descriptions provided in Table 5-2 or elsewhere in this disclosure, and the terminology may have different meanings depending on context, including in the context of different embodiments.

The table titled Algorithm 5-2 illustrates some example pseudocode that may be used to implement a conversion strategy with V2K resource borrowing according to this disclosure.

The following example implementation details for a conversion operation for Case 5 may be described in the context of the embodiments of FIG. 15, FIG. 16, FIG. 17, Table 5-2, and Algorithm 5-2, but these details are for purposes of illustration, and the principles of this disclosure are not limited to these details.

Converting a device internal KV store for Case 5 may involve expanding the address range of a key set space and storing multiple user KV pairs inside one value slot in a device KV store. This conversion may be accomplished through V2K resource borrowing as shown in FIG. 17 and Algorithm 5-2.

A first subtask of the conversion process may configure the specifications of a converted KV store (convDevKVStore) which is exposed to a user KV store (userKVStore). Because ExCon2 is satisfied in Case 5, an extended "virtual" address range may match the key space set size of the user KV store.

Since both a userkey and a uservalue may be stored together in a value slot in a device internal KV store, the sum of userkey and uservalue, i.e., $|k_U|_{max}+|v_U|_{max}$ (which may be designated in bits, bytes or any other suitable unit), may be used as a spatial requirement for each user KV pair. Thus, each device KV pair may be able to support no more than $$\left\lfloor \frac{|v_I|_{max}}{|k_U|_{max}+|v_U|_{max}} \right\rfloor$$

user KV pairs. This may be seen, for example, in Algorithm 5-2 where the number of user KV pairs (referred to as "packNum") that may be stored in one device KV value slot may be calculated by using floor(devKVStore.getValueSizeLimit( )/(userKVStore.getKeySizeLimit( )+userKVStore.getValueSizeLimit( )).

In this example, a user KV pair may not be broken into more than one piece and, thus, separated into different device KV store value slots. Therefore, to accommodate a total number of user KV pairs equal to $|K_U|$, the device KV store may need to have at least $$\frac{|K_U|}{\left\lfloor \frac{|v_I|_{max}}{|k_U|_{max}+|v_U|_{max}} \right\rfloor}$$

total KV pairs. This may be related to the ExCon2 condition which is satisfied when $$|K_I| \geq \frac{|K_U|}{\left\lfloor \frac{|v_I|_{max}}{|k_U|_{max}+|v_U|_{max}} \right\rfloor}$$

for the user KV store and device KV store.

In other embodiments, however, any number x of user KV pairs may be stored in any number y of device value slots (i.e., x-to-y packing) with any suitable ratio of x:y that may distribute user KV pairs across device value slots to implement a V2K resource borrowing function.

Returning to the x:1 packing example, based on packNum (the number of user KV pairs that may be packed into each device KV value slot), the key size limit of the converted KV store may be expanded by a number of bits given by ceil(log(2, packNum)) in Item 2 of Algorithm 5-2. In some deployments, this expansion may result in an extended range having portions that may be unusable and/or inaccessible. For example, if packNum is 3, then the space may be extended by 2 bits. By doing so, the extended space may actually be four times (×4) the size of the original space, even though only three times the original space may be needed.

To prevent a potential loss of space, the lowest and highest keys that may be used in the convDevKVStore may be configured by calling the function addPrefixOfStrToStrWithinTtlLen at Items 3 and 4 of Algorithm 5-2. This function may add the prefix of the first given key string (the first argument) to the second key string (the second argument) within the total length of the third argument.

For example, at Item 3, assume devKVStore.getLowestKey( )=00,000,000, and this.convDevKVStore.getKeySizeLimit( )=10. Then, function addPrefixOfStrToStrWithinTtlLen may add 0's to the left side of the second argument (i.e., 00,000,000) until the total length is 12, i.e., returned value is 0,000,000,000. Similarly, at Item 4, assume binary (packNum)=binary(3)=10, devKVStore.getHighestKey ( )=11,111,111, and this.convDevKVStore.getKeySizeLimit( )=12. Based on these assumptions, the function addPrefixOfStrToStrWithinTtlLen may add 0's to the left side of the second argument (i.e., "00,000,000") until the total length is 12, i.e., the returned value is 1,000,000,000.

Thus, the range that function m may use later to conduct mapping (e.g., 1-to-1 mapping) may be from 0,000,000,000 to 1,000,000,000. That is, the conversion operation may only need to set up a continuous range with a lowest key and a highest key (in the extended device KV store) that satisfies the requirements of the user KV store, and simply let the mapping function m (in the Sec. 6) conduct one-to-one mapping between the key-value pairs in the user KV store and the key-value pairs in the converted KV store (convDevKVStore).

This may decouple the conversion and mapping functions, which in turn may eliminate additional work such as manually maintaining address tables and/or maps of forbidden, skipped and/or unavailable addresses.

A second subtask of the conversion process for Case 5 may configure a resource borrowing function for the converted KV store (convDevKVStore). Referring to FIG. 17 and Algorithm 5-2, at Item 5, a flag "IS_PACK_MODE" is set to True. This flag may be used to signal the mapping function m that this convDevKVStore may be operating in a packing mode, which in this example may be a 1-to-x packing mode.

At Item 6, a mapping function may be defined for, and/or assigned to, the converted KV store (convDevKVStore). To accommodate Case 5, the mapping function may be implemented as a value packing function which may map one or more user KV pairs to device a KV pair. This type of mapping may be characterized as conversion mapping to distinguish it from the mapping function m which may be characterized as a final or "last mile" mapping. In this example, a value packing type of mapping function may be implemented with a simple linear mapping approach that may map each user KV pair to an offset location within a value slot indicated by an offset within the device KV store. Referring to FIG. 16, each user KV pair may be mapped to a portion (which may be referred to as a "chunk") of a value slot (which may be referred to as a "bucket") in the device KV store.

Specifically, the mapping function may first find the device internal KV store's key for the given userkey by finding the "bucket" (n-th original device internal KV store's key) that the userkey is in (e.g., using this. convDevKVStore.getLowestKey+floor(x/packNum)) as shown in Algorithm 5-2. The offset of this portion within the value slot (i.e., the offset of the "chunk" within the "bucket") may be calculated by using "x MOD packNum" where x indicates the specific userkey that is being accessed. Finally, the mapping function may return one KV pair (if it exists) by calling the function accessFromValueByOffset. The function accessFromValueByOffset may access the portion (with offset) from the value slot devKVStore.get(devKey) using the calculated offset.

An example of a relationship between the lowest and highest keys may be found in the example embodiment shown in FIG. 16 where symbols for the lowest and highest keys may be found in Table 5-2.

5.2.2 Case 6: Borrow Resources from Key to Value (Sharding)

In Case 6, the value size limit for a user KV store may be larger than the value size limit for a device KV store, but the key set space size for the user KV store may be smaller than that for the device KV store, and extra condition ExCon3 may be true. Thus, the KV adapter may borrow resources from key-to-value or K2V, Borrowing resources from key-to-value may be implemented, for example, with a sharding function in which one or more user KV pairs may be divided into segments, shards or "chunks" and stored in a larger number of device value slots. In some embodiments, a single user KV pair may be segmented or "sharded" or "chunked" into multiple device value slots, in which case it may be referred to as "1-to-x sharding." In other embodiments, multiple user KV pairs may be sharded into multiple device value slots, i.e., x-to-y sharding in any ratio of x:y that may be suitable for borrowing resources within a device KV store.

Figure 18:
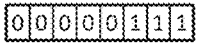
FIG. 18 illustrates an example embodiment of a process for converting a device KV store to a converted KV store based on a sharding type of resource borrowing strategy according to this disclosure.

FIG. 18 illustrates an example embodiment of a process for converting a device KV store to a converted KV store based on a sharding type of resource borrowing strategy that may be used for Case 6 according to this disclosure. The top cell on the right of FIG. 18 may include one or more expressions for base conditions and/or extra conditions such as those described above with respect to Tables 4-1 and 4-2. The middle cell on the right may provide a graphical representation, not necessarily to scale, of the relative sizes of a user key size limit and a device key size limit, and the relative sizes of a user value size limit and a device value size limit. The symbols $\wedge$ and $\vee$ may represent the mathematical operators < and >, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a device KV store based on the conversion strategy for the specific case.

Figure 19:
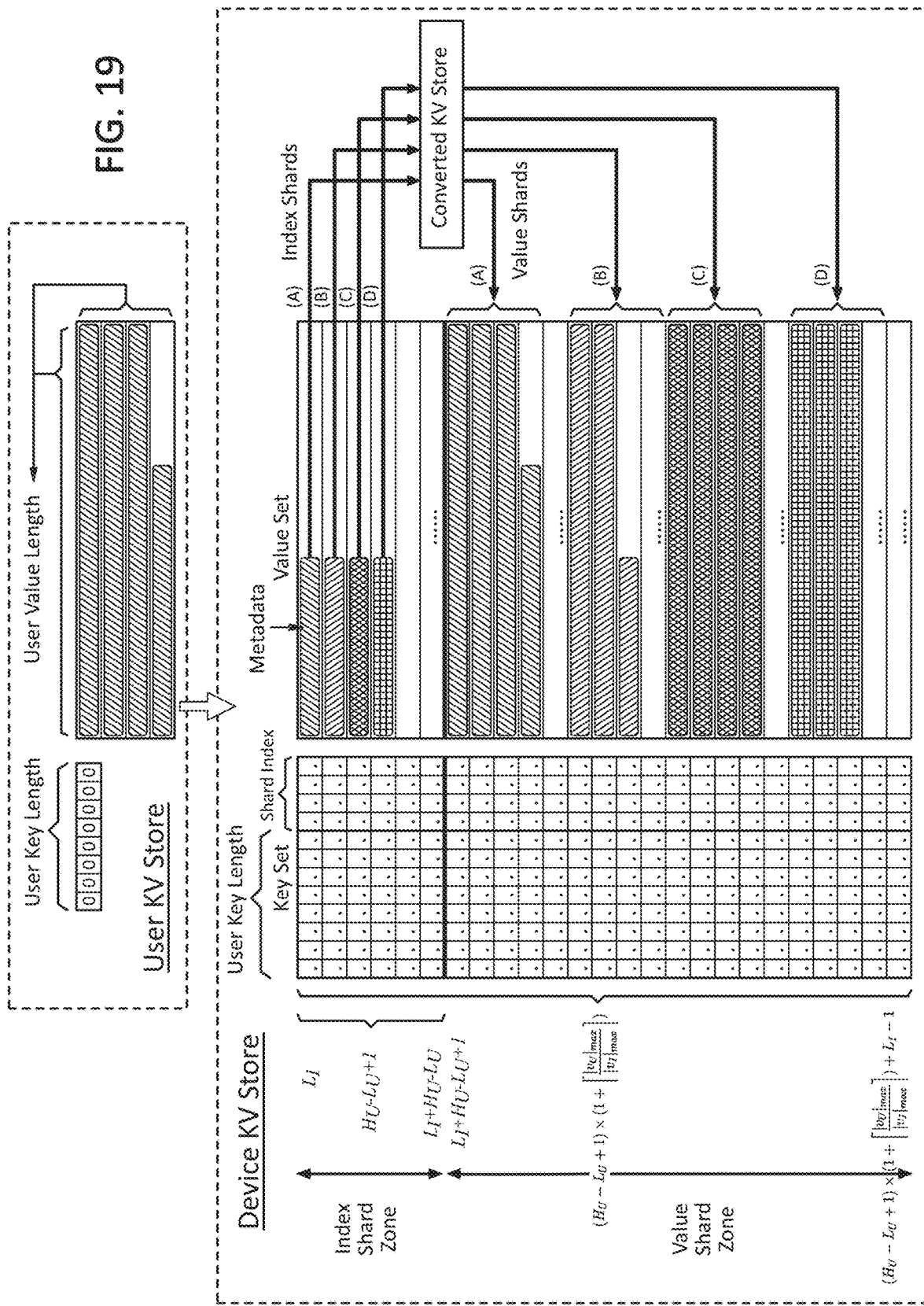
FIG. 19 illustrates an example embodiment of a conversion mapping from keys and values of a user KV store to keys and values of a device KV store according to this disclosure.

FIG. 19 illustrates an example embodiment of a conversion mapping from keys and values of a user KV store to keys and values of a device KV store through a converted KV store (convDevKVStore) based on a sharding type of resource borrowing strategy according to this disclosure.

Figure 20:
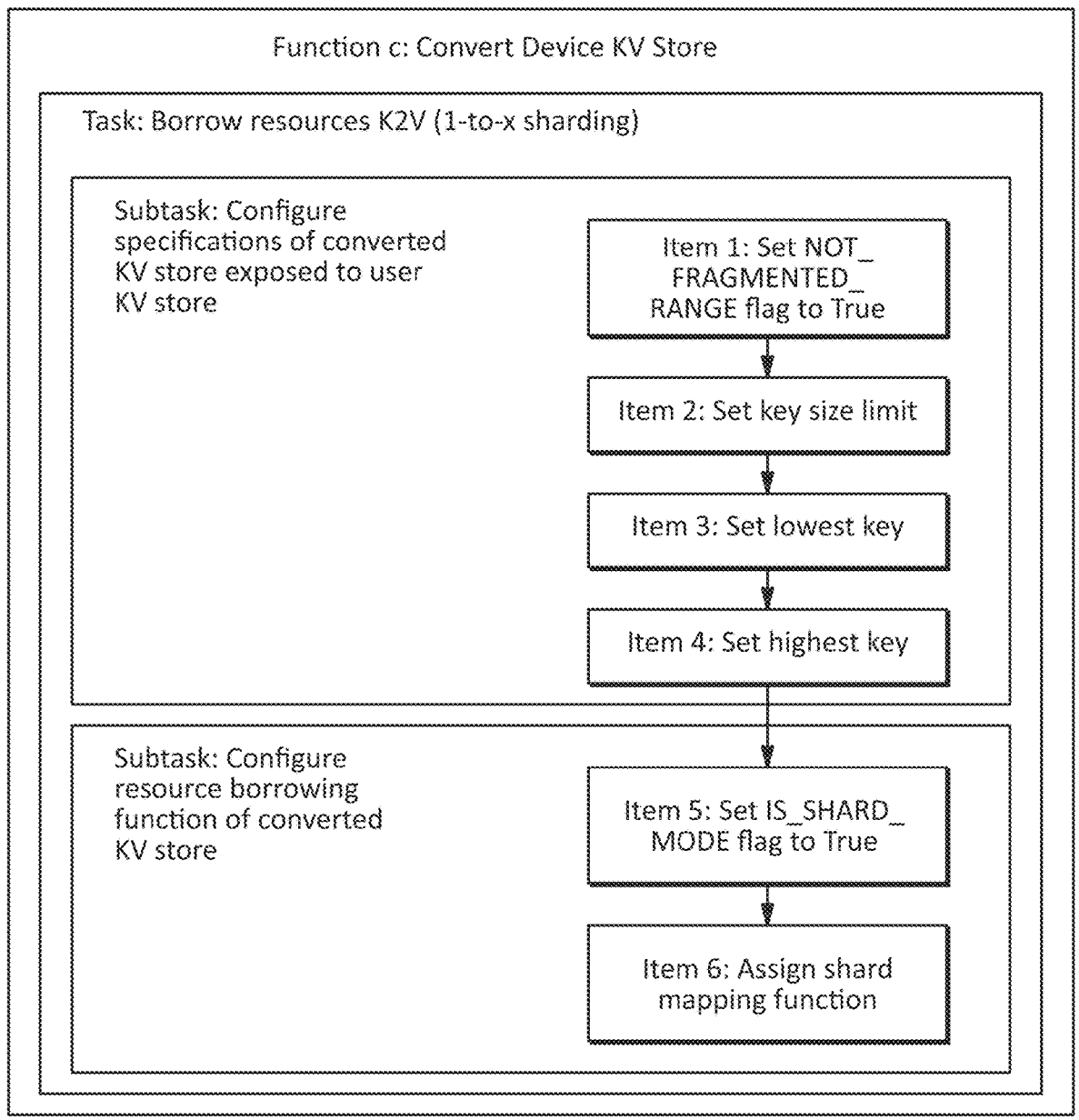
FIG. 20 illustrates an example embodiment of a workflow module for converting a device KV store to a converted KV store using a conversion strategy with sharding resource borrowing according to this disclosure.

FIG. 20 illustrates an example embodiment of a workflow module for converting a device KV store to a converted KV store using a conversion strategy with K2V resource borrowing according to this disclosure. The embodiment illustrated in FIG. 20 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges.

Table 5-3 describes some example symbols, terminology, expressions, pseudocodes, zone boundaries and the like that may be used in conjunction with the embodiments that may implement a sharding type of resource borrowing strategy that may be used for Case 6 according to this disclosure. These symbols, terminology, expressions, pseudocodes, zone boundaries and the like, however, may not be limited to the descriptions provided in Table 5-3 or elsewhere in this disclosure, and the terminology may have different meanings depending on context, including in the context of different embodiments.

The table titled Algorithm 5-3 illustrates some example pseudocode that may be used to implement a conversion strategy with K2V resource borrowing according to this disclosure.

The following example implementation details for a conversion operation for Case 6 may be described in the context of the embodiments of FIG. 18, FIG. 19, FIG. 20, Table 5-3, and Algorithm 5-3, but these details are for purposes of illustration, and the principles of this disclosure are not limited to these details.

Converting a device internal KV store for Case 6 may involve mapping the keys of user KV pairs to value slots in an Index Shard Zone in a device KV store, and mapping the values of user KV pairs to value slots in a Value Shard Zone in the device KV store. These zones and their boundaries may be seen in FIG. 19 along with first/lowest and last/highest keys in each zone.

An Index Shard Zone may be used, for example, to directly store user keys. In some embodiments, an Index Shard Zone may also be used to store metadata such as the sizes of segments or chunks in each value slot. A Value Shard Zone may be used to store the actual shards (i.e., the multiple small "chunks") of the data in the value of a user KV pair.

In some embodiments, converting a device internal KV store for K2V resource borrowing such as Case 6 may involve two subtasks as shown in Algorithm 5-3 and FIG. 20. The first subtask may involve configuring the specifications of a converted KV store (convDevKVStore) which is exposed to a user KV Store. This first subtask may include, for example, mapping user keys to the Index Shard Zone as shown in FIG. 19. The second subtask may involve configuring a resource borrowing function for the convDevKV-Store. This second subtask may include, for example, further maps from the Index Shard Zone to corresponding shards in the Value Shard Zone as shown in FIG. 19.

Referring to Algorithm 5-3 and FIG. 20, at Item 1 of the first subtask, a NOT_FRAGMENTED_RANGE flag in convDevKVStore may be set to True. This flag may be used in function m to qualify whether the range is fragmented or not. At Item 2, the key size limit of the converted KV store (convDevKVStore) may be set to the key size limit of the device KV store (devKVStore). This may tell the mapping function m the actual length of the key size limit for the device KV store. At Item 3, the lowest key of the converted KV store (convDevKVStore) may be set to the same as the lowest key $L_I$ of the devKVStore using devKVStore.getLowestKey( ). At Item 4, the highest key of the convDevKV-Store may be set to the end of the Index Shard Zone $L_I+H_U-L_U$ using devKVStore.getLowestKey( )+userKV-Store.getHighestKey( )−userKVStore.getLowestKey( ).

The second subtask of a conversion process for a K2V resource borrowing strategy such as Case 6 may configure a resource borrowing function for the converted KV store (convDevKVStore). At Item 5, a flag IS_SHARD_MODE is set to True. This flag may be used to signal the mapping function m that this convDevKVStore may be operating in a sharding mode, which in this example may be a 1-to-x sharding mode. At Item 6, a sharding mapping function may be defined for, and/or assigned to, the converted KV store (convDevKVStore). In this example, the mapping function "shardMapFunc" may be assigned by defining this. convDevKVStore.shardMapFunc as shown in the pseudocode of Algorithm 5-3.

For each given input user key x (denoted as "$r_U$" to indicate a range in the expressions shown in Table 5-3), the main procedure of shardMapFunc may first map a user KV pair to the Index Shard Zone using one device KV pair for each user KV pair. However, the actual value of the user KV pair may not be stored in the Index Shard Zone. Instead, metadata such as the user key may be stored in the corresponding value slot of the Index Shard Zone. (In addition, other useful data such as size and/or version information and the like may be stored in the metadata section in the Index Shard Zone.) The actual value shards of the user value may be stored in the Value Shard Zone which may also be accessed by the mapping function shardMapFunc.

As an example of some possible implementation details, the mapping function shardMapFunc may calculate the number of shards "valShardNum" associated with a specific userkey x. The mapping function may also calculate the first value shard key "firstValShardKey" and the last value shard key "lastValShardKey" according to the expressions in the column "Mapped KV Pairs" in Table 5-3 and as shown in Algorithm 5-3. The function may then calculate "valShard-BlockID" which may be defined as the distance from the given userkey x to the lowest key in the userKVStore (e.g., valShardblockID may be 0 for the first userkey). In this example, a linear mapping approach may be used to access all value shards of the user key x by requesting the KV pairs in range of $$L_I + H_U - L_U + (r_U - L_u) \times \left\lceil \frac{|v_U|_{max}}{|v_I|_{max}} \right\rceil + 1$$

to $$L_I + H_U - L_U + (r_U - L_u + 1) \times \left\lceil \frac{|v_U|_{max}}{|v_I|_{max}} \right\rceil$$

in the devKVStore. This may be accomplished, for example, by calling "return returnKVPairsInRange(first-ValShardKey, lastValShardKey)".

As mentioned above, an index shard (e.g., a value slot in the Index Shard Zone of the device KV store) may be used to store additional information and/or parameters such as version control information, adaptive size control information, and the like, which may be used, for example, to implement additional features. Thus, the principles of this disclosure may enable the extension and support of additional features, for example, through the use of an index shard and/or other data structures and/or processes.

5.3 Category 3: Scale Out

For cases in Category 3, the device KV store may not be able to support the given user KV store without scaling out. The device KV store may be scaled out in any manner. For example, if the given or original device KV store is implemented with a single KV storage device, it may be scaled out by adding one or more additional KV storage devices. In other words, in this type of embodiment, "scaling out" may be a type of capacity expansion concentrating on the addition of new hardware resources instead of increasing the capacity of already available hardware resources such as storage or processing silos. As another example, however, if the given device KV store is implemented with a key-value software layer and/or library over one or more block storage devices, it may be scaled out by adding one or more additional block storage devices and configuring the software layer and/or library accordingly. In yet another example, if the given device KV store is implemented as a KV store with virtualized storage, a storage area network (SAN), storage as a service (STasS), software defined storage (SDS), and/or any other type of flexible and/or on-demand storage infrastructure, the given device KV store may be scaled out by simply requesting a larger amount of storage in the KV store, and using the specifications of scaled out KV store as the starting point for the conversion by the KV adapter.

In some embodiments, the given or original device KV store may be scaled out during deployment, but in other embodiments, the device KV store may be scaled out after deployment, for example, to adjust to changing conditions. Moreover, in some embodiments, the given or original device KV store may be scaled out on a "per deployment" basis, but in other embodiments, it maybe scaled out on a "per I/O" basis.

In some embodiments, only the key space may be scaled out rather than the value size limit, for example, because resources may be borrowed internally, e.g., from key to value. In other embodiments, however, any aspect of the given or original device KV store may be scaled out.

Adapting a user KV store to a device KV store using a conversion strategy that involves scaling out may include two subtasks. The first subtask may include determining how much additional KV storage space may be needed. The second subtask may include determining an overall adapting or conversion strategy, for example, a strategy for mapping the given user KV store to the scaled out KV storage space.

The scaling out conversion strategies described below, which may be used, for example, to adapt KV stores in cases 7, 8, 9, 10 and 11, may be described in the context of some example implementation details including: (i) scaling out may be implemented by adding one or more new KV store device(s) that is(are) the same as (e.g., may have the same specifications as) the existing (original) KV store device; (ii) scaling may be on a granularity of "per KV store deployment" rather than "per I/O"; and (iii) only the key space may be scaled out, rather than the value size limit. However, these example implementation details are only provided for purposes of illustrating example embodiments, and the principles of this disclosure are not limited to these details.

Based on these example implementation details, the first subtask for scaling out cases 7-11 as described below may include determining how many additional devices may be needed. This may include the use of a "scale factor" s which may provide the number of devices that may be needed to support the given user KV store. That is, the additional number of the same type of devices that may be needed may equal (s−1). The second subtask may include combining any or all of the conversion mapping strategies described above, such as directly use, packing and/or sharding, with the scaled out KV store.

5.3.1 Case 7: Scale Out (SO) and Borrow Resources Value-to-Key (Packing)

In Case 7, the user key space may be greater than the device key space, and the user value space may be less than the device value space. However, ExCon2 may be false, i.e., even if multiple user KV pairs are mapped to each device value slot, the device KV store may still not have enough capacity to support the user KV store. That is, the device internal key-value store may not be able borrow adequate key space from its value space to implement a resource borrowing function without scaling out.

Thus, in some embodiments, the device KV store may be scaled out, and the key space of the device may be extended, for example, according to Eq. 5-2:

$$s \times |K_I| \geq \frac{|K_U|}{\left\lfloor \frac{|v_I|_{max}}{|k_U|_{max} + |v_U|_{max}} \right\rfloor} \quad \text{(Eq. 5-2)}$$

which may be rearranged to find the scale factor s as shown in Eq. 5-3:

$$s \geq \left\lceil \frac{|K_U|}{|K_I| \times \left\lfloor \frac{|v_I|_{max}}{|k_U|_{max} + |v_U|_{max}} \right\rfloor} \right\rceil \quad \text{(Eq. 5-3)}$$

which may be the least number of devices needed to implement the given user KV store using value-to-key (V2K) resource borrowing such as, for example, x-to-1 packing with the scaled out device KV store. The combination of scaling out by a factor of s followed by x-to-1 packing may be referred to symbolically as xs→x-to-1 packing.

In other embodiments that may be used to implement Case 7, the scale factor s may be increased more aggressively as shown in Eq. 5-5 below and reproduced here:

$$s = \left\lceil \frac{|K_U|}{|K_I|} \right\rceil \quad \text{(Eq. 5-5)}$$

which may enable a 1-to-1 mapping to be used between the user KV store and the converted (scaled out) device KV store without the spatial efficiency of packing.

Figure 21:
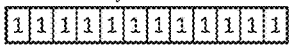
FIG. 21 illustrates an example embodiment of a process for converting a device KV store to a converted KV store based on a scale out and packing type of resource borrowing strategy according to this disclosure.

FIG. 21 illustrates an example embodiment of a process for converting a device KV store to a converted KV store based on a scale out (SO) and V2K (packing) type of resource borrowing strategy that may be used for Case 7 according to this disclosure. The top cell on the right of FIG. 21 may include one or more expressions for base conditions and/or extra conditions such as those described above with respect to Tables 4-1 and 4-2. The middle cell on the right may provide a graphical representation, not necessarily to scale, of the relative sizes of a user key size limit and a device key size limit, and the relative sizes of a user value size limit and a device value size limit. The symbols ∧ and ∨ may represent the mathematical operators < and >, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a scaled out device KV store based on the conversion strategy for the specific case.

Figure 22:
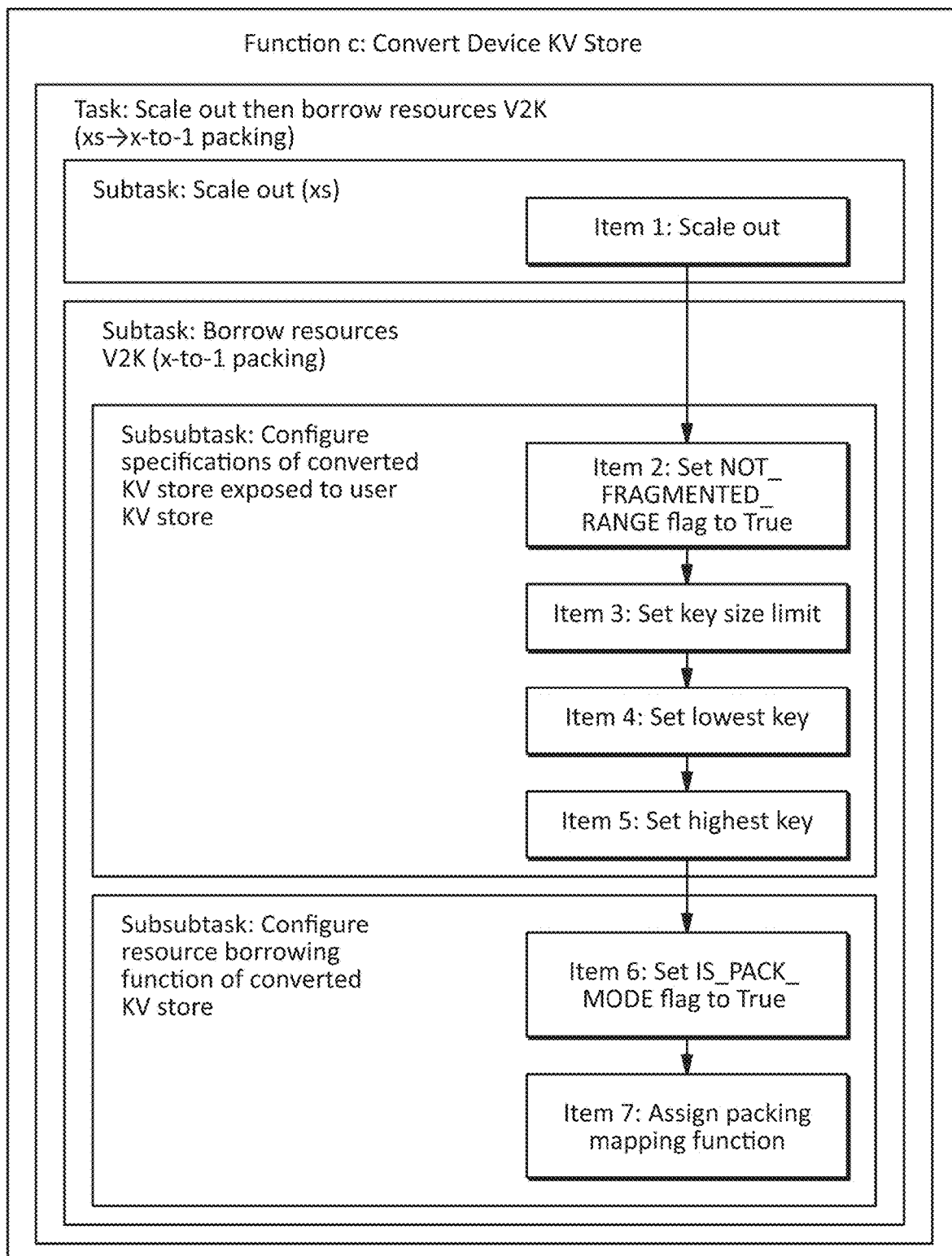
FIG. 22 illustrates an example embodiment of a workflow module for converting a device KV store to a converted KV store using a conversion strategy that may combine scaling out with V2K resource borrowing according to this disclosure.

FIG. 22 illustrates an example embodiment of a workflow module for converting a device KV store to a converted KV store using a conversion strategy that may combine scaling out with V2K resource borrowing that may be used for Case 7 according to this disclosure. The embodiment illustrated in FIG. 22 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges.

The table titled Algorithm 5-4 illustrates some example pseudocode that may be used to implement a conversion strategy that may combine scaling out with V2K resource borrowing that may be used for Case 7 according to this disclosure.

The embodiments illustrated with respect to FIG. 21, FIG. 22 and Algorithm 5-4 may be used in conjunction with any suitable packing strategy, for example, the packing strategy similar to that described above with respect to FIG. 16 for Case 5, Likewise, the symbols, descriptions and the like used in Eq. 5-2, Eq. 5-3 and Eq. 5-5 may be similar to those used with the embodiments described above.

Referring to FIG. 22 and Algorithm 5-4, a first subtask may include scaling out a device KV store, for example, according to Eq. 5-3. A second subtask may include first and second subsubtasks similar to the first and second subtasks illustrated in FIG. 17 and Algorithm 5-2 but with various changes to accommodate the scaling out of the device KV store. For example, when calculating the key size limit in Item 3, the number of user KV pairs (referred to as "pack-Num") that may be stored in one device KV value slot may be multiplied by the scale factor s. As another example, slight changes may be made in Item 7 when assigning the mapping function compared to Item 6 in Case 5.

5.3.2 Case 8: Scale Out (SO) and Directly Use (DU)

In Case 8, the key space of the user KV store may be greater than the key space of the device KV store, while the value size limit may be the same for both KV stores. However, because ExCon4 may be true, i.e., ExCon1, ExCon2 and ExCon3 are all false, adequate resources may not be borrowed to support a value-to-key packing strategy (as in Case 5), and thus, the device internal KV store may not support the user KV store without scaling out.

Thus, in some embodiments, the device KV store may be scaled out, for example, according to Eq. 5-4:

$$s \times |K_I| \geq |K_U| \quad \text{(Eq. 5-4)}$$

which may be rearranged to find the scale factor s as shown in Eq. 5-5:

$$s = \left\lceil \frac{|K_U|}{|K_I|} \right\rceil \quad \text{(Eq. 5-5)}$$

which may indicate the minimum number of devices s that may be needed to support the user KV store.

Figure 23:
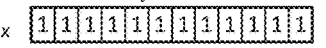
FIG. 23 illustrates an example embodiment of a process for converting a device KV store to a converted KV store based on a scale out and Directly Use type of conversion strategy according to this disclosure.

FIG. 23 illustrates an example embodiment of a process for converting a device KV store to a converted KV store based on a scale out (SO) and Directly Use (DU) type of conversion strategy that may be used for Case 8 according to this disclosure. The top cell on the right of FIG. 23 may include one or more expressions for base conditions and/or extra conditions such as those described above with respect to Tables 4-1 and 4-2, The middle cell on the right may provide a graphical representation, not necessarily to scale, of the relative sizes of a user key size limit and a device key size limit, and the relative sizes of a user value size limit and a device value size limit. The symbols ∨ and ∥ may represent the mathematical operators < and =, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a scaled out device KV store based on the conversion strategy for the specific case.

Figure 24:
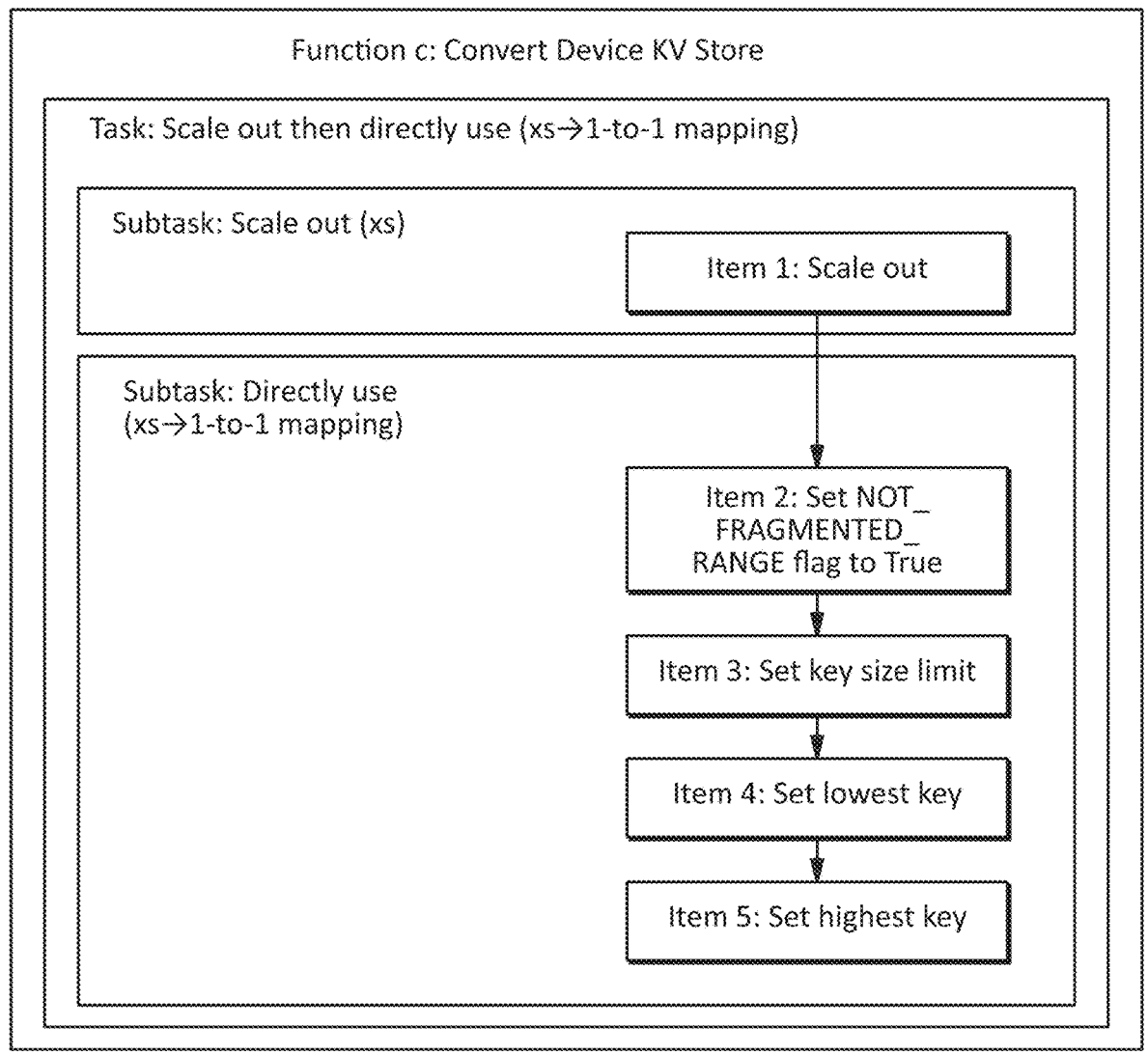
FIG. 24 illustrates an example embodiment of a workflow module for converting a device KV store to a converted KV store using a conversion strategy that may combine Scale Out and Directly Use according to this disclosure.

FIG. 24 illustrates an example embodiment of a workflow module for converting a device KV store to a converted KV store using a conversion strategy that may combine Scale Out (SO) and Directly Use (DU) that may be used for Case 8 according to this disclosure. The embodiment illustrated in FIG. 24 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges.

The table titled Algorithm 5-6 illustrates some example pseudocode that may be used to implement a conversion strategy that may combine Scale Out (SO) and Directly Use (DU) such as that for Case 7 according to this disclosure.

The embodiments illustrated with respect to FIG. 23, FIG. 24 and Algorithm 5-5 may be used in conjunction with any suitable Directly Use (DU) mapping strategy, for example, a one-to-one mapping similar to that described above with respect to the cases in Category 1. Likewise, the symbols, descriptions and the like used in Eq. 5-4, and Eq. 5-5 may be similar to those used with the embodiments described above. The combination of scaling out by a factor of s followed by 1-to-1 conversion mapping may be referred to symbolically as xs→1-to-1 mapping.

Referring to FIG. 24 and Algorithm 5-5, a first subtask may include scaling out a device KV store, for example, according to Eq. 5-5. A second subtask may include first and second subsubtasks similar to the first and second subtasks illustrated in FIG. 10 and Algorithm 5-1 including conducting a 1-to-1 mapping between the user KV store and the converted (scaled out) device KV store.

5.3.3 Cases 9-11: Scale Out (SO) and Borrow Resources Key-to-Value (Sharding)

In Cases 9, 10 and 11, as in Case 6, the value size limit for a user KV store may be larger than the value size limit for a device KV store, and the key set space size for the user KV store may be smaller than that for the device KV store. However, ExCon3 may be False (Case 9), or ExCon4 may be True (Case 10 and Case 11), and thus, unlike Case 6, the KV adapter may not be able to borrow adequate resources from key-to-value or K2V.

Therefore, the adapter may scale out the device KV store according Eq. 5-6:

$$s \times |K_I| \geq |K_U| \times \left(1 + \left\lceil \frac{|v_U|_{max}}{|v_I|_{max}} \right\rceil\right) \quad \text{(Eq. 5-6)}$$

which may be rearranged as Eq. 5-7:

$$s = \frac{|K_U| \times \left(1 + \left\lceil \frac{|v_U|_{max}}{|v_I|_{max}} \right\rceil\right)}{|K_I|} \quad \text{(Eq. 5-7)}$$

to find the scale factor s which may indicate the minimum number of devices that may be needed to support the user KV store.

Figure 26:
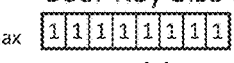
Figure 27:
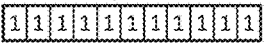

FIGS. 25, 26 and 27 illustrate example embodiments of a process for converting a device KV store to a converted KV store based on a scale out (SO) and K2V (sharding) type of resource borrowing strategy that may be used for Cases 9-11, respectively, according to this disclosure. The top cells on the right of FIGS. 25, 26 and 27 may include one or more expressions for base conditions and/or extra conditions such as those described above with respect to Tables 4-1 and 4-2. The middle cell on the right may provide a graphical representation, not necessarily to scale, of the relative sizes of a user key size limit and a device key size limit, and the relative sizes of a user value size limit and a device value size limit. The symbols ∧ and ∨ may represent the mathematical operators < and >, respectively, rotated to a vertical orientation. The lower cell on the right may provide a graphical representation, not necessarily to scale, illustrating relative sizes and/or relationships and/or mappings and the like between: (i) the keys and values in a user KV store, (ii) the keys and values in a converted KV store and (iii) the keys and values in a scaled out device KV store based on the conversion strategy for the specific case.

Figure 28:
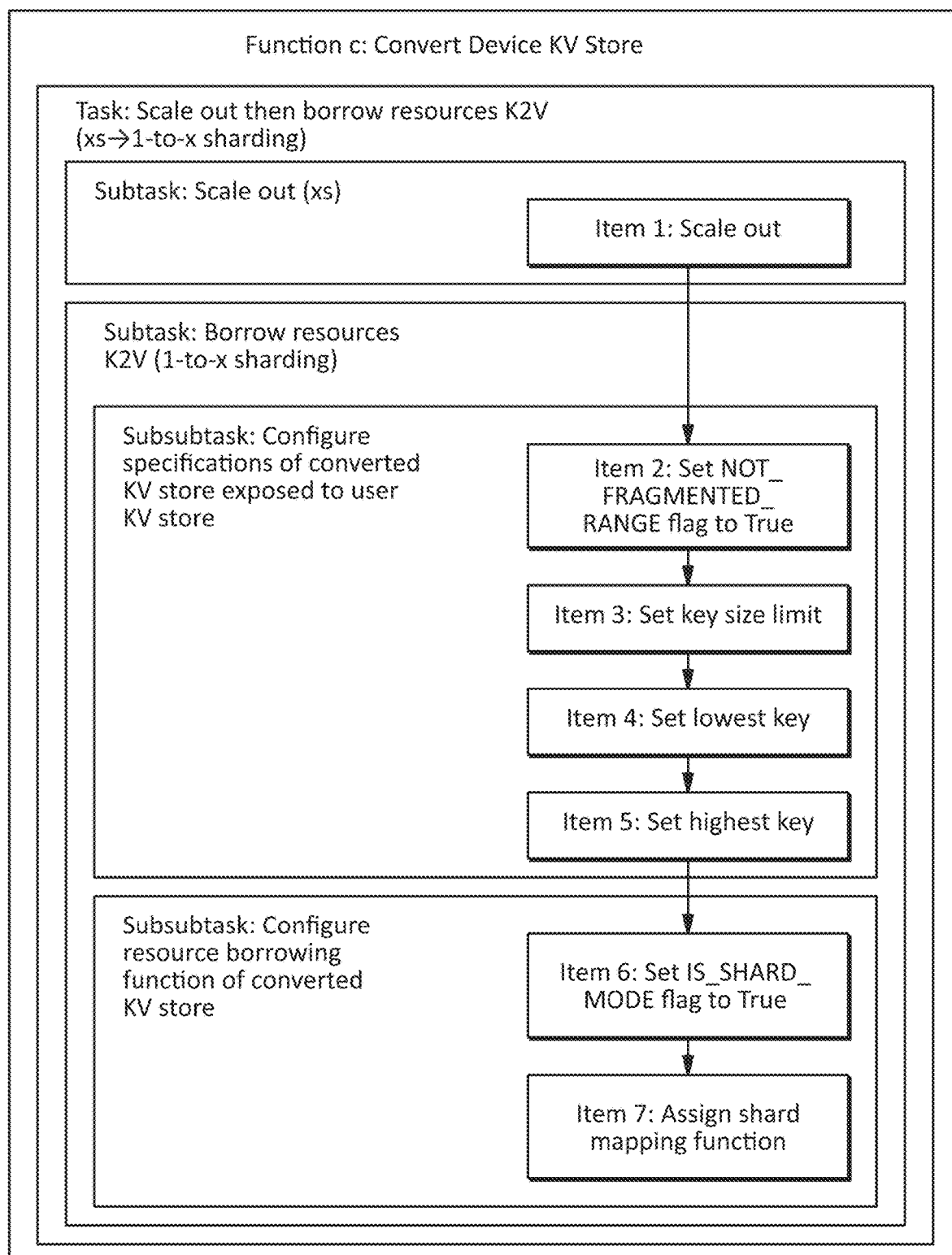
FIG. 28 illustrates an example embodiment of a workflow module for converting a device KV store to a converted KV store using a conversion strategy that may combine scaling out with sharding resource borrowing according to this disclosure.

FIG. 28 illustrates an example embodiment of a workflow module for converting a device KV store to a converted KV store using a conversion strategy that may combine scaling out with K2V resource borrowing that may be used for Cases 9-11 according to this disclosure. The embodiment illustrated in FIG. 28 may be used, for example, with an embodiment of a mapping function m that may only accommodate converted KV stores having unfragmented key ranges with no skips or unused or forbidden spaces. Other embodiments of conversion strategies and/or mapping functions m, however, may allow for fragmented key ranges.

The table titled Algorithm 5-6 illustrates some example pseudocode that may be used to implement a conversion strategy that may combine scaling out with K2V resource borrowing that may be used for Cases 9-11 according to this disclosure.

The embodiments illustrated with respect to FIGS. 25, 26, 27, and 28 and Algorithm 5-6 may be used in conjunction with any suitable sharding strategy, for example, a sharding strategy similar to that described above with respect to FIG. 19 for Case 6. Likewise, the symbols, descriptions and the like used in Eq. 5-6 and Eq. 5-7 may be similar to those used with the embodiments described above.

Referring to FIG. 28 and Algorithm 5-6, a first subtask may include scaling out a device KV store, for example, according to Eq. 5-7. A second subtask may include first and second subsubtasks similar to the first and second subtasks illustrated in FIG. 20 and Algorithm 5-3 for Case 6, but with various changes to accommodate the scaling out of the device KV store. For example, the scale factor s may be used when calculating the key size limit in Item 3. As another example, slight changes may be made in Item 7 when assigning the mapping function compared to Item 6 in Case 6.

6. Function m: Final Mapping

After a conversion strategy has been selected and a device KV store has been converted according to the selected strategy, a KV adapter according to this disclosure may implement a final, or "last mile" mapping from the user KV store to the converted KV store. A mapping function m may map the key space of a given user KV store to the key space of a given device internal KV store.

Some example embodiments and details are described below in the context of mapping functions that may implement one-to-one mapping, but the principles of this disclosure encompass other types of final mapping.

That is, other implementations may use mapping functions that do not use a 1-to-1 mapping function m, for example mapping functions that may use "prefix" or "suffix" approaches.

6.1 Usage of Function m in Different Cases

Function g may convert the device internal KV store into a new converted KV store that may be exposed to the user KV store as a KV store with (i) the same (or larger) key set space size, and (ii) the same (or larger) value size limit. In other words, despite different adapting strategies such as Directly Use, Borrowing Resources (1-to-x sharding or x-to-1 packing), or Scaling Out (with or without an additional borrowing strategy), eventually the converted KV store that may be exposed to the user KV store may have a "logical address range" that may be compatible with the user KV store.

Table 6-1 provides a summary of some examples of how the final mapping function m may be used in conjunction with converted device KV stores that have been converted based on different conversion strategies in various categories and cases.

In some embodiments, a RAID-5 set may provide a metaphor to explain an adapting process according to this disclosure. That is, by gathering multiple disks into a RAID-5 set, the file system may see a single, unified virtual volume with massive storage. RAID-5 in this metaphor may be similar to "converting" and "adapting" according to some embodiments of this disclosure, and the file system may be analogous to a user KV store. Thus, depending on the embodiment, the Function m may be analogous to a RAID-5 protocol that may hide the implementation beneath RAID-5 from the file system and maps the file system's I/O to a disk array.

6.2 Formulation of Function m

In some embodiments, any or all of four constraints may be formulated and/or used to formulate a mapping function m which may then be used in a mapping function implementation. These constraints may be used, for example, to formulate a function m which may map keys in two given key ranges with the same, or effectively the same, key space. Specifically, the function m may be formulated to conduct 1:1 mapping from a given (binarized) user key range to a given (binarized) target key range under any number of the following four constraints.

Constraint 1: The Two Given Ranges May be the Same Size, or the Device Internal KV Store May have a Larger Key Space as Set Forth in Eq. 6-1:

$$H_U - L_U + 1 \leq H_I - L_I + 1 \tag{Eq. 6-1}$$

which may be described as a general constraint. In an actual implementation, the two ranges may likely be equal because, as described in Section 5 above, the converted device internal KV store may be designed to have the same number of keys (KV pairs) as the user KV store to enable the function m to conduct 1:1 mapping.

By default, a function m may use a range of "the very first key of the device internal KV store" (i.e., $L_I$) to "the key that encloses enough space for the given user KV store key range" (i.e., $L_I + H_U - L_U$). (This range may be illustrated in FIG. 29.)

In some embodiments, a key in the device internal KV store that may be used for mapping may be in the range: $r_I \in [L_I, L_I + H_U - L_U]$. In such an embodiment, if "=" holds in Eq. 6-1, the two given inputs may be the same size so the KV adapter may simply map from the first key to the last key of each KV store, i.e., $r_I \in [L_I, H_U]$.

Constraint 2: Both Ranges May be Contiguous (i.e., not "Skipping").

In some embodiments, the KV adapter may only allow 1-to-1 mapping between two contiguous ranges, for example, to avoid the cost of mapping maintenance for skipping around fragmented ranges. Eq. 6-2 may define contiguous ranges for both KV stores.

$$\begin{cases} \forall r_U \in [L_U, H_U - 1], & \exists! r_U + 1 \in [L_U, H_U] \\ \forall r_I \in [L_I, H_I - 1], & \exists! r_I + 1 \in [L_I, H_I] \end{cases} \quad \text{(Eq. 6-2)}$$

Constraint 3: One-to-One and Bidirectional Mapping.

In some embodiments, for each key $r_U$ inside the given user KV store key range, there may exist only one corresponding key $r_I$ inside the given device internal KV store key range that is mapped by the function m. Likewise, for each key $r_I$ inside the given device internal KV store key range, there may exist only one corresponding key $r_U$ inside the given user KV store key range that is mapped by the inverse function $m^{-1}$.

$$\begin{cases} \forall r_U \in [L_U, H_U], & \exists! r_I = m(r_U) \in [L_I, H_I] \\ \forall r_I \in [L_I, L_I + H_U - L_U], & \exists! r_U = m^{-1}(r_I) \in [L_I, L_I + H_U - L_U] \end{cases} \quad \text{(Eq. 6-3)}$$

This constraint, as set forth in Eq. 6-3. may ensure bidirectional and surjective mapping, which may be critical because a KV adapter (e.g., UnivKVAdapter) may need to locate a key in the device internal KV store using the corresponding given key in the user KV store, and vise versa. In some embodiments, both direction mappings may be deterministic, for example, to prevent an incorrect value from being accessed during runtime (on-the-fly).

Constraint 4: The Value Size Limit of the Device Internal KV Store is Sufficient.

The conversion function c may have satisfied this constraint during the conversion process. However, in some embodiments, it may still be necessary and/or beneficial to ensure that the value size limit of the device internal (target) KV store is larger than or equal to that of the given user KV store as set forth in Eq. 6-4.

$$|v_U|_{max} > |v_I|_{max} \quad \text{(Eq. 6-4)}$$

6.3 Implementation of One-to-One Mapping

Figure 29:
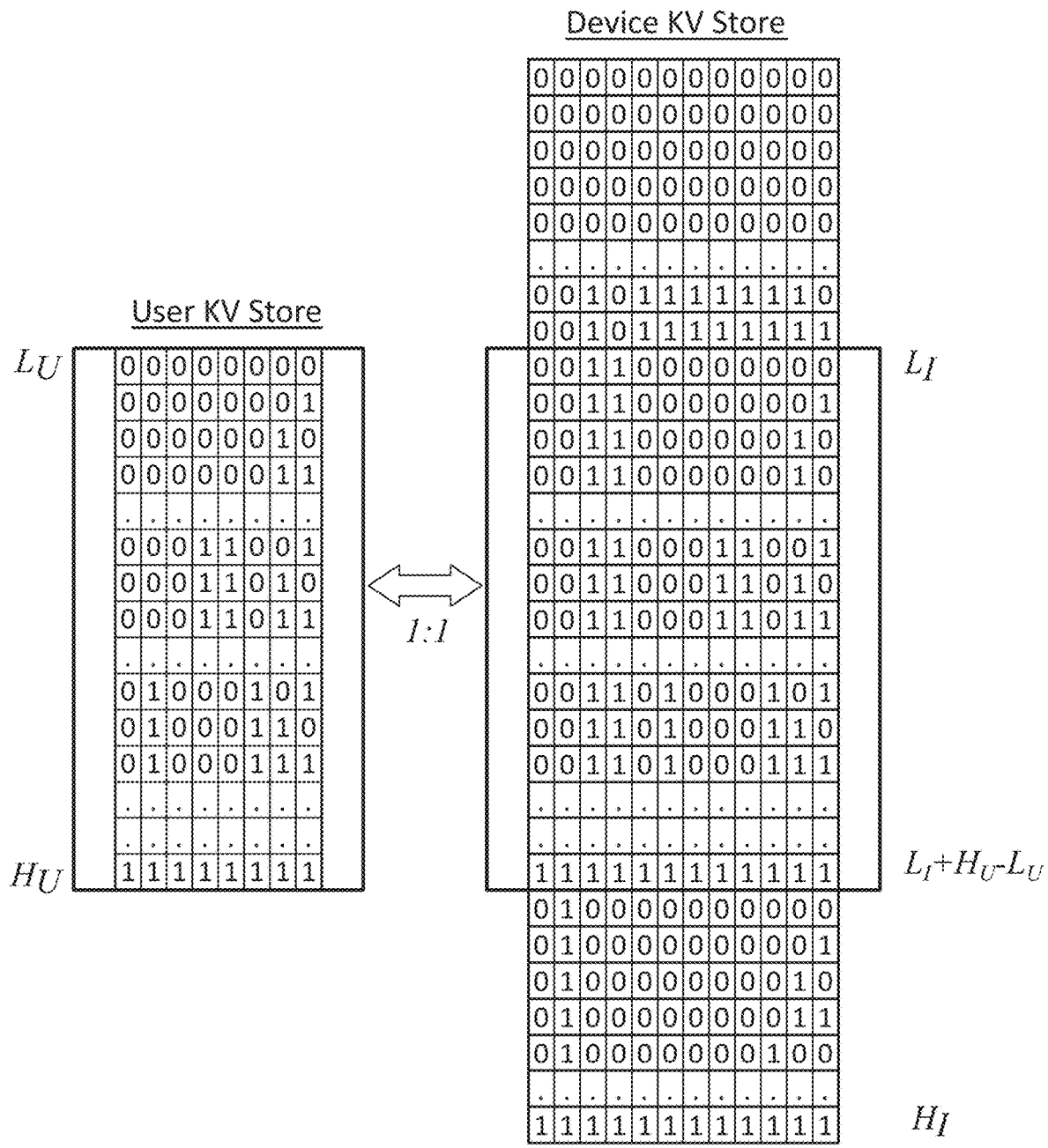
FIG. 29 illustrates an example embodiment of a one-to-one final mapping process according to this disclosure.

FIG. 29 illustrates an example embodiment of a one-to-one final mapping process according to this disclosure. The embodiment illustrated in FIG. 29 may satisfy all four of the constraints set forth above. In this example, the two KV stores may have the same value size limits, and thus, constraint 4 may be satisfied. The given user key range may be assumed to be from 00,000,000 to 11,111,111. Although the target device internal key range may be from 000,000,000,000 to 111,111,111,111, the available range may be from 001,100,000,000 to 001,111,111,111. Thus, both KV stores may have a range of $2^8=256$ keys, which may satisfy constraint 1. Both of these distinct ranges are contiguous, which satisfies constraint 2.

In some embodiments, one possible implementation of the mapping function m may be a simple linear mapping, as set forth in Eq. 6.4.

$$r_I = m(r_U) = r_U - L_U + L_I \quad \text{(Eq. 6-4)}$$

This approach may use the very beginning of the device KV store which is $L_I$=00,000,000 to map $L_U$=001,100,000,000, and map the last $H_U$=11,111,111 to $L_I+H_U-L_U$=000,011,111,111.

The table titled Algorithm 6-1 illustrates some example pseudocode that may be used to implement an embodiment of a linear mapping function according to this disclosure. The pseudocode includes a procedure oneToOneMap which may first check whether constraints 1, 2 and 4 are satisfied. Once the constraint checking is passed, the oneToOneMap procedure may generate a 1-to-1 mapping function using the linear mapping shown in Eq. 6-4. The linear mapping may be reflected in the statement "this.convDevKVStore.KVMapper.func(x)=this.convDevKVStore.getLowestKey( )−userKVStore.getLowestKey( )+x". The oneToOneMap procedure may then assign the generated mapping function to the KVMapper for convDevKVStore. Thus, converted device KV store (convDevKVStore) may use the generated one-to-one mapping function to conduct the final (last-mile) mapping.

In some embodiments, using a linear mapping function may provide one or more advantages over a "prefix" or "suffix" approach which may not be able to limit the usage of certain keys that are not allowed to be used. This may be understood, for example, with reference to Table 6-2 which shows an extended address range of 000,000,000,000 to 011,111,111,111 for four disks, each having a range of 000,000,000 to 111,111,111. If, for some reason, the user key range runs from 100,000,000,000 to 111,111,111,111, it may not be possible to shift left or right to generate a "prefix" or "suffix" to map. In contrast, in some embodiments, using a linear mapping function according to the principles of this disclosure may eliminate or reduce this problem.

7. Version Support

In some KV store implementations, it may be useful to retain multiple versions of a KV pair (e.g., an object). An embodiment of a KV store according to the principles of this disclosure may provide a good infrastructure for object storage having version support. For example, a first version of a video file titled "testVideo.mp4" (version 001) and a newer version titled "testVideo.mp4" (version 002) may be store on the same disk. This may be referred to as storing them "in a single bucket". A version feature such as this may allow a user access to previous versions, which may protect the user from the consequences of unintended overwrites and deletions. A user KV store may typically specify the maximum number of versions it may support for each KV pair. The maximum number of versions supported by a store may designated as ε and may be obtained by calling "userKVStore.getVersionNum( )".

Some embodiments of a KV store according to the principles of this disclosure may achieve a synergistic result by combining a version and key to generate a "new key". Depending on the implementation details, this may be accomplished without making any fundamental changes to the KV adapter.

In some embodiments, the key space of a user KV store may be extended by multiplying by the maximum number of versions. This approach may focus on "ID/number of keys" as mentioned above in Subsection 2.1, rather than simply concatenating or "gluing" two strings together. A further potential benefit of this approach is that it, in some embodiments, it may be accomplished with relatively minor modifications to the functions f, g, c, and m, some examples of which are described below.

Tables 7-1A and 7-1 B, which collectively form Table 7-1, illustrates some examples of modifications that may be made to base conditions to support multiple versions, wherein c represents the number of versions that may be supported according to the principles of this disclosure.

Table 7-2 illustrates some examples of modifications that may be made to pseudocodes to support multiple versions according to the principles of this disclosure.

The table titled Algorithm 7-1 illustrates some examples of pseudocode modifications that may be made to four fundamental operations for an API to support multiple versions according to the principles of this disclosure.

Various organizational aids such as a table of contents, section headings, and the like, may be provided herein as a convenience, but the subject matter arranged according to these aids and the principles of this disclosure are not limited by these organizational aids.

The embodiments disclosed above have been described in the context of various implementation details, but the principles of this disclosure are not limited these or any other specific details. Certain embodiments may have been described as having specific processes, steps, items, etc., but these terms may also encompass embodiments in which a specific process, step, item, etc. may be implemented with multiple processes, steps, etc., or in which multiple process, steps, items, etc. may be integrated into a single process, step, etc. A reference to a component or element may refer to only a portion of the component or element. The use of terms such as "first" and "second" in this disclosure and the claims may only be for purposes of distinguishing the things they modify and may not to indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims,

TABLE 2-1

| # | Symbols | Description |
|---|---------|-------------|
| 1 | k, v | User KV store's key length limit. |
| 2 | $\|k\|, \|v\|$ | Actual length (size) for a key or a value. For example, a (binarized) key may have 12 bits ($2^{12} = 4096$ number of keys), and a value is 2 MB (megabytes). |
| 3 | $\|k\|_{max}, \|v\|_{max}$ | Length limit (size upperbound) for each key or each value. For example, a key has 64 bits limit, and a value has 12 MB size limit. |
| 4 | K, V | Key or value set, i.e., all keys or values in the key or value space. |
| 5 | $\|K\|, \|V\|$ | Size of key or value set, i.e., the total number of keys or values that may be in the key or value space. The total number of keys and values may typically be the same (i.e., the number of KV pairs): $2^{\|k\|} = \|K\| = \|V\|$ |
| 6 | S | The set of the entire KV store, i.e., the superset of the key set and the value set. |

TABLE 2-2

| # | Symbols | Description |
|---|---------|-------------|
| 1 | $\|k_U\|_{max}$ | User KV store's key length limit. |
| 2 | $\|k_I\|_{max}$ | Device internal KV store's key length limit. |
| 3 | $\|v_U\|_{max}$ | User KV store's value length limit. |
| 4 | $\|v_I\|_{max}$ | Device internal KV store's value length limit. |
| 5 | $\|K_U\| = \|V_U\| = 2^{\|k_U\|_{max}}$ | Max number of keys and values that are allowed in the user KV store. Max number of keys and values that are allowed in the device internal KV store. |
| 6 | $\|K_I\| = \|V_I\| = 2^{\|k_I\|_{max}}$ | Max number of keys and values that are allowed in the device internal KV store. |

TABLE 3-1

| # | Symbols | Pseudocodes | Description |
|---|---------|-------------|-------------|
| 1 | $S_U, S_I, S_I', \omega$ | userKVStore, devKVStore, convDevKVStore, strategy | User KV store, device internal KV store, converted device KV store, and selected strategy, respectively. |
| 2 | $f(S_U, S_I)$ | adaptTwoKVStores(userKVStore, devKVStore) | The "main function" of the UnivKVAdapter which adapts two given KV stores. |
| 3 | $g(S_U, S_I)$ | selStrategy(userKVStore, devKVStore) | Select strategy based on given KV stores' specifications, and the result of this function is the strategy $\omega = g(S_U, S_I)$. |
| 4 | $c(S_I, \omega)$ | convDevKV(devKVStore) | Convert the given device internal KV store according to the result of strategy selection, i.e., $\omega$. The result of this function is the converted device KV store, i.e., $S_I' = c(S_I, \omega)$. |
| 5 | $m(S_U, S_I')$ | oneToOneMap(userKVStore, convDevKVStore) | Conducts one-to-one mapping from the user KV store to the converted device KV store. |

TABLE 4-1

| # | Base Conditions | (BsCon_1) $\|v_U\|_{max} < \|v_I\|_{max}$ | (BsCon_2) $\|v_U\|_{max} < \|v_I\|_{max}$ | (BsCon_3) $\|v_U\|_{max} < \|v_I\|_{max}$ |
|---|---|---|---|---|
| 1 | (BsCon1_) $\|K_U\| < \|K_I\|$ | [Case 1] Conditions: BsCon11 == T && ExCon1 == T Strategy: Directly use (DU). Details: Subsection 5.1 | [Case 3] Conditions: BsCon12 == T && ExCon1 == T Strategy: Directly use (DU). Details: Subsection 5.1 | [Case 6] Conditions: BsCon13 == T && ExCon1== T && ExCon3 == T Strategy: Borrow space from key space to value shards (K2V sharding). Details: Subsection 5.2 [Case 9] Conditions: BsCon13 == T && ExCon3 == F Strategy: Scale out (SO) then K2V sharding. Details: Subsection 5.3 |
| 2 | (BsCon2_) $\|K_U\| = \|K_I\|$ | [Case 2] Conditions: BsCon21 == T && ExCon1 = T Strategy: Directly use (DU), Details: Subsection 5.1 | [Case 4] Conditions: BsCon22 == T && ExCon1 == T Strategy: Directly use (DU). Details: Subsection 5.1 | [Case 10] Conditions: BsCon23 == T && ExCon4 == T Strategy: Scale out (SO) then K2V sharding. Details: Subsection 5.3 |
| 3 | (BsCon3_) $\|K_U\| > \|K_I\|$ | [Case 5] Conditions: BsCon31 == T && ExCon1 = T && ExCon2 == T Strategy: Borrow space from value to key space (V2K packing). Details: Subsection 5.2 [Case 7] Conditions: BsCon31 == T && ExCon2 == F Strategy: Scale out (SO) then V2K packing. Details: Subsection 5.3 | [Case 8] Conditions: BsCon32 == T && ExCon1 == T Strategy: Scale out (SO) then directly use. Details: Subsection 5.3 | [Case 11] Conditions: BsCon33 == T && ExCon4 == T Strategy: Scale out (SO) then K2V sharding. Details: Subsection 5.3 |

TABLE 4-2

| # | Extra Condition ID | Inequations | Description | Strategies |
|---|---|---|---|---|
| 1 | ExCon1 | $\|K_U\| \times \|v_U\|_{max} \leq \|K_I\| \times \|v_I\|_{max}$ | Necessary and sufficient condition to support the user KV store. | Directly use (DU). |
| 2 | ExCon2 | $\|K_I\| \geq \dfrac{\|K_U\|}{\left\lfloor \dfrac{\|v_I\|_{max}}{\|k_U\|_{max} + \|v_U\|_{max}} \right\rfloor}$ | Necessary but not sufficient condition to borrow key space from value space. | If BsCon31== T && ExCon1==T && ExCon2==T: Borrow space from value to key space (V2K). |
| 3 | ExCon3 | $\|K_I\| \geq \|K_U\| \times \left(1 + \left\lceil \dfrac{\|v_U\|_{max}}{\|v_I\|_{max}} \right\rceil \right)$ | Necessary but not sufficient condition to borrow value space from key space. | If BsCon13==T && ExCon1==T && ExCon3==T: Borrow space from key space to value shards (K2V). |
| 4 | ExCon4 | ExCon1==F &&ExCon2==F &&ExCon3==F | Last condition that covers all other cases that there is in no way to support the user KV store with the given device. | Scale out (SO) by adding more storage, e.g., same KV-based storage devices. |

TABLE 5-1

| # | Category | Cases | Subsection | Example FIGS. | Algorithm | Workflow charts | Converting strategy | Strategy in math | Address range may be extended by |
|---|---|---|---|---|---|---|---|---|---|
| 1 | 1 | 1-4 | 5.1 | FIG. 11 FIG. 12 FIG. 13 FIG. 14 | Alg. 5-1 | FIG. 10 | Directly Use | 1-to-1 mapping | N/A |
| 2 | 2 | 5 | 5.2.1 | FIG. 15 FIG. 16 | Alg. 5-2 | FIG. 17 | Borrow Resource V2K | x-to-1 packing | Offsets in value |
| 3 | 2 | 6 | 5.2.2 | FIG. 18 FIG. 19 | Alg. 5-3 | FIG. 20 | Borrow Resource K2V | 1-to-x sharding | Keys |
| 4 | 3 | 7 | 5.3.1 | FIG. 21 | Alg. 5-4 | FIG. 22 | Scale out then Borrow Resource V2K | xs → x-to-1 packing | Additional storage, e.g., disks, and offsets in value |
| 5 | 3 | 8 | 5.3.2 | FIG. 23 | Alg. 5-5 | FIG. 24 | Scale out then Directly Use | xs → 1-to-1 mapping | Additional storage, e.g., disks |
| 6 | 3 | 9-11 | 5.3.3 | FIG. 25 FIG. 26 FIG. 27 | Alg. 5-6 | FIG. 28 | Scale out then Borrow Resource K2V | xs → 1-to-x sharding | Additional storage, e.g., disks, and keys |

TABLE 5-2

| # | Symbols | Description |
|---|---|---|
| 1 | L, H | The first value (i.e., the "lowest" value) and the last value (i.e., the "highest" value) in the given KV store key range. |
| 2 | $L_U, H_U$ | The first value (i.e., the "low" value) and the last value (i.e., the "high" value) in the given user KV store key range. "U" may stand for "user KV store". |
| 3 | $L_I, H_I$ | The first value (i.e., the "low" value) and the last value (i.e., the "high" value) in the given device internal KV store key range. "I" may stand for "device internal KV store". |
| 4 | $r_U, r_I$ | A key inside the user KV store key range and (target) device internal KV store key range. |

TABLE 5-3

| # | Boundaries | Expression | Index Shard Zone | Value Shard Zone | Mapped KV Pairs |
|---|---|---|---|---|---|
| 1 | From | Pseudocode | devKVStore.getLowestKey( ) | devKVStore.getLowestKey( )+ userKVStore.getHighestKey( )- userKVStore.getLowestKey( )+1 | devKVStore.getLowestKey( )+ userKVStore.getHighestKey( )- userKVStore.getLowestKey( )+ (valShardBlockID)* valShardNum+1 |
| 2 | From | Math | $L_I$ | $L_I + H_U - L_U + 1$ | $L_I + H_U - L_U + (r_U - L_u) \times \left\lceil \frac{|v_U|_{max}}{|v_I|_{max}} \right\rceil + 1$ |
| 3 | To | Pseudocode | devKVStore.getLowestKey( )+ userKVStore.getHighestKey( )- userKVStore.getLowestKey( ) | (userKVStore.getHighestKey( )- userKVStore.getLowestKey( )+1)* (1+shardNum)+ devKVStore.getLowestKey( )-1 | devKVStore.getLowestKey( )+ userKVStore.getHighestKey( )- userKVStore.getLowestKey( )+ (valShardBlockID+1)*valShardNum |
| 4 | To | Math | $L_I + H_U - L_U$ | $(H_U - L_U + 1) \times \left(1 + \left\lceil \frac{|v_U|_{max}}{|v_I|_{max}} \right\rceil\right) + L_I - 1$ | $L_I + H_U - L_U + (r_U - L_u + 1) \times \left\lceil \frac{|v_U|_{max}}{|v_I|_{max}} \right\rceil$ |

TABLE 6-1

| # | Category | Cases | Converting strategies | Strategy in math | Address range may be extended by | Function m may map kv pair of user KV store to |
|---|---|---|---|---|---|---|
| 1 | 1 | 1-4 | Directly Use | 1-to-1 mapping | N/A | The original device internal KV store. |
| 2 | 2 | 5 | Borrow Resource V2K | x-to-1 packing | Offsets in value | The extended range (by using offsets in value) of the original device internal KV store. |
| 3 | 2 | 6 | Borrow Resource K2V | 1-to-x sharding | Keys | The extended range (by using shardings) of the original KV stores. |
| 4 | 3 | 7 | Scale Out then Borrow Resouces V2K | xs → x-to-1 packing | Additional storage, e.g., disks, and offsets in value | The extended range (by using offsets in value) of the original and additional device internal KV store. |
| 5 | 3 | 8 | Scale Out then Directly Use | xs → 1-to-1 mapping | Additional storage, e.g., disks | The extended range of the original and additional device internal KV stores. |
| 6 | 3 | 9-11 | Scale Out then Borrow Resources K2V | xs → x-to-1 sharding | Additional storage, e.g., disks, and keys | The extended range (by using shardings) of the original and additional device internal KV stores. |

TABLE 6-2

| # | Device | First Address | Last Address |
|---|---|---|---|
| 1 | Original Disk | 000,000,000,000 | 000,111,111,111 |
| 2 | Second Disk | 001,000,000,000 | 001,111,111,111 |
| 3 | Third Disk | 010,000,000,000 | 010,111,111,111 |
| 4 | Fourth Disk | 011,000,000,000 | 011,111,111,111 |

TABLE 7-1

| # | Condition | One Version Inequations | Two Version Inequations |
|---|---|---|---|
| 1 | BsCon11 | $|K_U| < |K_I|$ && $|v_U|_{max} < |v_I|_{max}$ | $\varepsilon \times |K_U| < |K_I|$ && $|v_U|_{max} < |v_I|_{max}$ |
| 2 | BsCon12 | $|K_U| < |K_I|$ && $|v_U|_{max} = |v_I|_{max}$ | $\varepsilon \times |K_U| < |K_I|$ && $|v_U|_{max} = |v_I|_{max}$ |
| 3 | BsCon13 | $|K_U| < |K_I|$ && $|v_U|_{max} > |v_I|_{max}$ | $\varepsilon \times |K_U| < |K_I|$ && $|v_U|_{max} > |v_I|_{max}$ |
| 4 | BsCon21 | $|K_U| = |K_I|$ && $|v_U|_{max} < |v_I|_{max}$ | $\varepsilon \times |K_U| = |K_I|$ && $|v_U|_{max} < |v_I|_{max}$ |
| 5 | BsCon22 | $|K_U| = |K_I|$ && $|v_U|_{max} = |v_I|_{max}$ | $\varepsilon \times |K_U| = |K_I|$ && $|v_U|_{max} = |v_I|_{max}$ |
| 6 | BsCon23 | $|K_U| = |K_I|$ && $|v_U|_{max} > |v_I|_{max}$ | $\varepsilon \times |K_U| = |K_I|$ && $|v_U|_{max} > |v_I|_{max}$ |
| 7 | BsCon31 | $|K_U| > |K_I|$ && $|v_U|_{max} < |v_I|_{max}$ | $\varepsilon \times |K_U| > |K_I|$ && $|v_U|_{max} < |v_I|_{max}$ |
| 8 | BsCon32 | $|K_U| > |K_I|$ && $|v_U|_{max} = |v_I|_{max}$ | $\varepsilon \times |K_U| > |K_I|$ && $|v_U|_{max} = |v_I|_{max}$ |
| 9 | BsCon33 | $|K_U| > |K_I|$ && $|v_U|_{max} > |v_I|_{max}$ | $\varepsilon \times |K_U| > |K_I|$ && $|v_U|_{max} > |v_I|_{max}$ |
| 10 | ExCon1 | $|K_U| \times |v_U|_{max} \leq |K_I| \times |v_I|_{max}$ | $\varepsilon \times |K_U| \times |v_U|_{max} \leq |K_I| \times |v_I|_{max}$ |
| 11 | ExCon2 | $|K_I| \geq |K_U| \times \left(1 + \left\lceil \frac{|v_U|_{max}}{|v_I|_{max}} \right\rceil \right)$ | $|K_I| \geq \varepsilon \times |K_U| \times \left(1 + \left\lceil \frac{|v_U|_{max}}{|v_I|_{max}} \right\rceil \right)$ |
| 12 | ExCon3 | $|K_I| \geq \dfrac{|K_U|}{\left\lfloor \frac{|v_I|_{max}}{|k_U|_{max} + |v_U|_{max}} \right\rfloor}$ | $|K_I| \geq \dfrac{\varepsilon \times |K_U|}{\left\lfloor \frac{|v_I|_{max}}{|k_U|_{max} + |v_U|_{max}} \right\rfloor}$ |

Algorithm 2-1:

| | Algorithm 2-1 |
|---|---|
| 1 | Class KVStore: |
| 2 |   # Data Members: |
| 3 |   keys=new KeySet( ) |
| 4 |   vals=new ValSet( ) |
| 5 |   ... |
| 6 | |
| 7 |   # Member Procedures: |
| 8 |   # Map function h |
| 9 |   Procedure map(key) |
| 10 |     # retrieve the value by a given key |
| 11 |     ... |
| 12 |     return valPointer |
| 13 | |
| 14 |   # retrieve the value by a given key |
| 15 |   Procedure get(key) |
| 16 |     if key in this.keys: |

-continued

Algorithm 2-1

```
17          return this.vals[map(key)]
18       else:
19          return ERROR("KEY_NOT_FOUND")
20
21    # insert a key-value pair to the KV store
22    Procedure put(key, value):
23       if key in this.keys:
24          this.keys.add(key)
25          this.vals.add(map(key), value)
26          return SUCCESS
27       else:
28          return ERROR("KEY_NOT_FOUND")
29
30    # delete a key-value pair by a given key
31    Procedure delete(key):
32       if key in this.keys:
33          this.keys.remove(key)
34          this.vals.remove(map(key))
35          return SUCCESS
36       else:
371         return ERROR("KEY_NOT_FOUND")
38
39    # update an existing key-value pair by a new given key-value pair
40    # assume only one version of key-value pair is allowed to be stored
41    Procedure update(key, value):
42       if key in this. keys:
42          this.vals[map(key)]=value
44          return SUCCESS
45       else:
46          this.put(key, value)
47          return SUCCESS
```

Algorithm 2-2:

Algorithm 2-2

```
1     Procedure get(key):
2        return UnivKVAdpater.get(key)
3
4     Procedure put(key, value):
5        return UnivKVAdpater.put(key, value)
6
7     Procedure delete(key):
8        return UnivKVAdpater.delete(key)
9
10    Procedure update(key):
11       return UnivKVAdpater.update(key, value)
```

Algorithm 3-1:

Algorithm 3-1

```
1   Class UnivKVAdpater:
2   # Data Members:
3   convDevKVStore-new KVStoreAlias(devKVStore)
4   strategy=NULL_STRATEGY
5   BsCons-new vector( )
6   ExCons-new vector( )
7
8   # Member Procedures:
9   # Function f: main function of adapter.
10  Procedure adaotTwoKVStores(userKVStore, devKVStore)
11     this.strategy=this.selStrategy(userKVStore, devKVStore)
12     this.convDevKV(userKVStore, devKVStore)
13     this.oneToOneMap(userKVStore)
14     return
15
16  # Function g: select the strategy for adapting
17  Procedure selStrategy(userKVStore, devKVStore)
18     # conduct strategy selection
19     ...
20     return
```

-continued

| Algorithm 3-1 |
|---|

```
21
22      # Function c: based on the selected strategy, convert the KV store.
23      Procedure convDevKV(userKVStore, devKVStore):
24          # convert the device internal KV store according to the given
                strategy
25          ...
26          return
27
28      # Function m: map KV pairs in both userKVStore and devKVStore.
29      Procedure oneToOneMap(userKVStore)
30          # conduct 1-to-1 mapping between two same-size KV stores
31          ...
32          return
33
34
35      # APIs of four fundamental operations exposed to the user KV store
36      Procedure get(key):
37          return this.convDevKVStore.get(key)
38
39      Procedure put(key, value):
40          return this.convDevKVStore.put(key, value)
41
42      Procedure delete(key):
43          return this.convDevKVStore.delete(key)
44
45      Procedure update(key):
46          return this.convDevKVStore.update(key, value)
```

Algorithm 4-1:

| Algorithm 4-1 |
|---|

```
1   Class UnivKVAdpater:
2       ...
3       # g( ) function
4       Procedure selStrategy(userKVStore, devKVStore)
5           # conduct strategy selection
6           this.BsCons=this.calBsCond(userKVStore, devKVStore)
7           this.ExCons=this.calExCond(userKVStore, devKVStore)
8           if (this.ExCons[1]):
9               # [Category 1, Cases 1-4] Directly use.
10              if (this.BsCons[1][1]):
11                  this.strategy-DIRECTLY_USE_CASE_01
12              else if (this.BsCons[2][1]):
13                  this.strategy-DIRECTLY_USE_CASE_02
14              else if (this.BsCons[1][2]):
15                  this.strategy-DIRECTLY_USE_CASE_03
16              else if (this.BsCons[2][2]):
17                  this.strategy=DIRECTLY_USE_CASE_04
18          else if (this.BsCons[3][1] and this.ExCons[1] and this.ExCons[2]):
19              # [Category 2, Case 5] Borrow space from value to key space
                    (V2K).
20              this.strategy=BORROW_K2V_CASE_05
21          else if (this.BsCons[1][3] and this.ExCons[1] and this.ExCons[3]):
22              # [Category 2, Case 6] Borrow space from key space to value
                    shards (K2V).
23              this.strategy-BORROW_V2K_CASE_06
24          else:
25              # [Cases 7~11] Scale out.
26              if (this.BsCons[3][1] and this.ExCons[2]==F):
27                  this.strategy=SCALE_OUT_CASE_07
28              else if (this.BsCons[3][2] and this.ExCons[4]):
29                  this.strategy-SCALE_OUT_CASE_08
30              else if (this.BsCons[1][3] and this.ExCons[3]==F):
31                  this.strategy-SCALE_OUT_CASE_09
32              else if (this.BsCons[2][3] and this.ExCons[4]):
33                  this.strategy-SCALE_OUT_CASE_10
34              else if (this.BsCons[3][3] and this.ExCons[4]):
35                  this.strategy-SCALE_OUT_CASE_11
36          return
```

Algorithm 5-1:

| Algorithm 5-1 |
|---|

```
1   Class UnivKVAdpater:
2       ...
3       # Function c
4       Procedure convDevKV(userKVStore, devKVStore):
5           # convert the device internal KV store according to the given
                strategy
6           if this.strategy.containString("DIRECTLY_USE"):
7               #######################################################
8               # [Task: Directly use (1-to-1 mapping)]
9               # Item 1: Set NOT_FRAGMENTED_RANGE flag to True
10              this.convDevKVStore.NOT_FRAGMENTED_RANGE-True
11
12              # Item 2: Set the key size limit
13              this.convDevKVStore.setKeySizeLimit(devKVStore.
                    getKeySizeLimit( ))
14
15              # Item 3: Set the lowest key
16              this.convDevKVStore.setLowestKey(devKVStore.getLowestKey( ))
17
18              # Item 4: Set the highest key
19              this.convDevKVStore.setHighestKey(devKVStore.getLowestKey( )+
                    userKVStore.getHighestKey( )-
                    userKVStore.getLowestKey( ))
20              #######################################################
21              ...
22      return
```

Algorithm 5-2:

| Algorithm 5-2 |
|---|

```
1   Class UnivKVAdpater:
2       ...
3       # Function c
4       Procedure convDevKV(userKVStore, devKVStore):
5           # convert the device internal KV store according to the given
                strategy
6           if this.strategy="BORROW_V2K_CASE_05":
7               #######################################################
8               # [Task: Borrow resource V2K (x-to-1 packing)]
9               #######################################################
10              # [Subtask: Configure specs of convDevKVStore exposed to
                    userKVStore]
11              # Item 1: Set NOT_FRAGMENTED_RANGE flag to True
12              this.convDevKVStore.NOT_FRAGMENTED_RANGE-True
13
14              # Item 2: Set the key size limit
15              packNum=floor(devKVStore.getValueSizeLimit( )/
                    (userKVStore.getKeySizeLimit( )+
                    userKVStore.getValueSizeLimit( )))
16              bitsToShift=ceil(log(2, packNum))
17              this.convDevKVStore.setKeySizeLimit(devKVStore.getKeySizeLimit( )+
                    bitsToShift)
18
19              # Item 3: Set the lowest key
20              newLowestKey=addPrefixOfStrToStrWithinTtlLen(0,
                    devKVStore.getLowestKey( ),
                    this.conv.DevKVStore.getKeySizeLimit( ))
21              this.convDevKVStore.setLowestKey(newLowestKey)
22
23              # Item 4: Set the highest key
24              newHighestKey=addPrefixOfStrToStrWithinTtlLen(binary(packNum),
                    devKVStore.getHighestKey( ),
                    this.convDevKVStore.getKeySizeLimit( ))
25              this.convDevKVStore.setHighestKey(newHighestKey)
26              #######################################################
27              # [Subtask: Configure resource borrowing function of
                    convDevKVStore]
```

Algorithm 5-2

```
28        # Item 5: Set the IS_PACK_MODE flag to True
29        this.convDevKVStore.IS_PACK_MODE=True
30
31        # Item 6: Assign the mapping function of value packing
32        this.convDevKVStore.packMapFunc.defineFunc: func(x)=
33        {
34          # Given the input userkey x, func outputs the KV pair stored
                in devKVStore
35          devKey=this.convDevKVStore.getLowestKey+floor(x/packNum)
36          offset=x MOD packNum
37          return returnKVPair(accessFromValueByOffset(devKVStore
                get(devKey), offset)
38        }
39        ####################################################
40        ...
41      return
```

Algorithm 5-3:

Algorithm 5-3

```
1   Class UnivKVAdpater:
2     ...
3     # Function c
4     Procedure convDevKV(userKVStore, devKVStore):
5       # convert the device internal KV store according to the given
            strategy
6       if this.strategy=="BORROW_V2K_CASE_06":
7         ####################################################
8         # [Task: Borrow resource K2V (1-to-x sharding)]
9         ####################################################
10        # [Subtask: Configure specs of convDevKVStore exposed to
              userKVStore]
11        # Item 1: Set NOT_FRAGMENTED_RANGE flag to True
12        this.convDevKVStore.NOT_FRAGMENTED_RANGE-True
13
14        # Item 2: Set the key size limit
15        this.convDevKVStore.setKeySizeLimit(devKVStore.getKeySizeLimit( ))
16
17        # Item 3: Set the lowest key
18        this.convDevKVStore.setLowestKey(devKVStore.getLowestKey( ))
19
20        # Item 4: Set the highest key
21        this.convDevKVStore.setHighestKey(devKVStore.getLowestKey( )+
              userKVStore.getHighestKey( )-userKVStore.getLowestKey( ))
22        ####################################################
23        # [Subtask: Configure resource borrowing function of
              convDevKVStore]
24        # Item 5: Set IS_SHARD_MODE flag to True
25        this.convDevKVStore.IS_SHARD_MODE-True
26
27        # Item 6: Assign the mapping function of value sharding
28        this.convDevKVStore.shardMapFunc.defineFunc: func(x)=
29        {
30          # Given the input userkey x, func outputs the KV pairs
                stored in devKVStore
31          # valShardBlockID is defined as the distance from the given
                userkey x to userKVStore's lowest key (i.e., the first
                userkey's valShardblockID is 0)
32          valShardNum      = ceil(userKVStore.getValueSizeLimit( )/
                devKVStore.getValueSizeLimit( ))
33          valShardBlockID  = x-userKVStore.getLowestKey( )
34          firstValShardKey = devKVStore.getLowestKey( )+
                userKVStoregetHighestKey( )-userKVStoregetLowestKey( )+
                (valShardBlockID) *valShardNum+1
35          lastValShardKey  = devKVStore.getLowestKey( )+
                userKVStore.getHighestKey( )-userKVStore.getLowestKey( )+
                (valShardBlockID+1)*valShardNum
36          return returnKVPairsinRange(firstValShardKey,
                lastValShardKey)
37        }
```

-continued

| Algorithm 5-3 |
|---|
| 38 ########################################## |
| 39 ... |
| 40 return |

Algorithm 5-4:

| Algorithm 5-4 |
|---|
| 1 Class UnivKVAdpater:
2  ...
3  # Function c
4  Procedure convDevKV(userKVStore, devKVStore):
5   # convert the device internal KV store according to the given strategy
6   if this.strategy=="SCALE_OUT_CASE_07":
7    ##########################################
8    # [Task: Scale out then borrow resource V2K (xs → x-to-1 packing)]
9    ##########################################
10    # [Subtask: Scale out (xs)]
11
12    # Item 1: Scale out
13    s=ceil(userKVStore.getKeySetSpaceSize( );
     (devKVStore.getKeySetSpaceSize( )*
     floor(devKVStore.getValueSizeLimit( )/
     (userKVStore.getKeySizeLimit( )+
     userKVStore.getValueSizeLimit( ))))
14    this.convDevKVStore.scaleOut(devKVStore, s-1)
15    ##########################################
16    # [Subtask: Borrow resource V2K (x-to-1 packing)]
17    # [Subsubtask: Configure specs of convDevKVStore exposed to userKVStore]
18
19    # Item 2: Set NOT_FRAGMENTED_RANGE flag to True
20    this.convDevKVStore.NOT_FRAGMENTED_RANGE=True
21
22    # Item 3: Set the key size limit
23    packNum=floor(devKVStore.getValueSizeLimit( )/
     (userKVStore.getKeySizeLimit( )+
     userKVStore.getValueSizeLimit( )))
24    bitsToShift-ceil(log(2, packNum*s))
25    this.convDevKVStore.
     setKeySizeLimit(devKVStore.getKeySizeLimit( )+
     bitsToShift)
26
27    # Item 4: Set the lowest key
28    newLowestKey=addPrefixOfStrToStrWithinTtlLen(0,
     devKVStore.getLowestKey( ),
     this.convDevKVStore.getKeySizeLimit( ))
29    this.convDevKVStore.setLowestKey(newLowestKey)
30
31    # Item 5: Set the highest key
32    newHighestKey=addPrefixOfStrToStrWithinTtlLen
     (binary(packNues),
     devKVStore.getHighestKey( ),
     this.convDevKVStore.getKeySizeLimit( ))
33    this.convDevKVStore.setHighestKey(newHighestKey)
34    ##########################################
35    # [Subsubtask: Configure resource borrowing function of convDevKVStore]
36
37    # Item 6: Set the IS_PACK_MODE flag to True
38    this.convDevKVStore.IS_PACK_MODE=True
39
40    # Item 7: Assign the mapping function of value packing
41    this.convDevKVStore.packMapFunc.defineFunc: func(x)-
42     {
43    # Given the input userkey x,
     func outputs the KV pair stored in devKVStore
44     devKey=this.convDevKVStore.getLowestKey+floor(x/packNum)
45     offset=x MOD packNum
46     return returnKVPair(accessFromValueByOffset
     (devKVStore.get(devKey), offset)
47    } |

Algorithm 5-4

| | |
|---|---|
| 48 | ########################################################## |
| 49 | ... |
| 50 | return |

Algorithm 5-5:

Algorithm 5-5

| | |
|---|---|
| 1 | Class UnivKVAdpater: |
| 2 | ... |
| 3 | # Function c |
| 4 | Procedure convDevKV(userKVStore, devKVStore): |
| 5 | # convert the device internal KV store according to the given strategy |
| 6 | if this.strategy=="SCALE_OUT_CASE_08": |
| 7 | ########################################################## |
| 8 | # [Task: Scale out then directly use (xs → 1-to-1 mapping)] |
| 9 | ########################################################## |
| 10 | # [Subtask: Scale out (xs)] |
| 11 | # Item 1: Scale out |
| 12 | s=ceil(userKVStore.getKeySetSpaceSize( )/(devKVStore.getKeySetSpaceSize( )) |
| 13 | this.convDevKVStore.scaleOut(devKVStore, s-1) |
| 14 | ########################################################## |
| 15 | # [Subtask: Directly use (1-to-1 mapping)] |
| 16 | # Item 2: Set NOT_FRAGMENTED_RANGE flag to True |
| 17 | this.convDevKVStore.NOT_FRAGMENTED_RANGE=True |
| 18 | |

-continued
Algorithm 5-5

| | |
|---|---|
| 19 | # Item 3: Set the key size limit |
| 20 | bitsToShift=ceil(log(2, s)) |
| 21 | this.convDevKVStore.setKeySizeLimit(devKVStore, getKeySizeLimit( )+bitsToShift) |
| 22 | |
| 23 | # Item 4: Set the lowest key |
| 24 | newLowestKey=addPrefixOfStrToStrWithinTtlLen(0, devKVStore.getLowestKey( ), this.convDevKVStore.getKeySizeLimit( )) |
| 25 | this.convDevKVStore.setLowestKey(newLowestKey) |
| 26 | |
| 27 | # Item 5: Set the highest key |
| 28 | newHighestKey=addPrefixOfStrToStrWithinTtlLen(binary(s), devKVStore.getHighestKey( ), this.convDevKVStore.getKeySizeLimit( )) |
| 29 | this.convDevKVStore.setHighestKey(newHighestKey) |
| 30 | ########################################################## |
| 31 | ... |
| 32 | return |

Algorithm 5-6:

Algorithm 5-6

| | |
|---|---|
| 1 | Class UnivKVAdpater: |
| 2 | ... |
| 3 | # Function c |
| 4 | Procedure convDevKV(userKVStore, devKVStore): |
| 5 | # convert the device internal KV store according to the given strategy |
| 6 | if this.strategy.containString("SCALE_OUT"): |
| 7 | ########################################################## |
| 8 | # [Task: Scale out then borrow resource K2V (xs → 1-to-x sharding)] |
| 9 | ########################################################## |
| 10 | # [Subtask: Scale out (xs)] |
| 11 | # Item 1: Scale out |
| 12 | if this.strategy=="SCALE_OUT_CASE_09" or "SCALE_OUT_CASE_10" or "SCALE_OUT_CASE_11": |
| 13 | s=ceil(userKVStore.getKeySetSpaceSize( )*(1+ceil(userKVStore.getValueSizeLimit( )/devKVStore.getValueSizeLimit( )))/devKVStore.getKeySetSpaceSize( )) |
| 14 | this.convDevKVStore.scaleOut(dev KVStore, s-1) |
| 15 | |
| 16 | ########################################################## |
| 17 | # [Subtask: Borrow resource K2V (1-to-x sharding)] |
| 18 | # [Subsubtask: Configure specs of convDevKVStore exposed to userKVStore] |
| 19 | # Item 2: Set NOT_FRAGMENTED_RANGE flag to True |
| 20 | this.convDevKVStore.NOT_FRAGMENTED_RANGE=True |
| 21 | |
| 22 | # Item 3: Set the key size limit |
| 23 | bitsToShift=ceil(log(2, s)) |
| 24 | this.convDevKVStore.setKeySizeLimit(devKVStore.getKeySizeLimit( )+bitsToShift) |
| 25 | |
| 26 | # Item 4: Set the lowest key |
| 27 | this.convDevKVStore.setLowestKey(devKVStore.getLowestKey( )) |
| 28 | |
| 29 | # Item 5: Set the highest key |
| 30 | this.convDevKVStore.setHighestKey(devKVStore.getLowestKey( )+userKVStore.getHighestKey( )-userKVStore.getLowestKey( )) |
| 31 | |
| 32 | ########################################################## |

Algorithm 5-6

| | |
|---|---|
| 33 | # [Subsubtask: Configure resource borrowing function of convDevKVStore] |
| 34 | # Item 6: Set IS_SHARD_MODE flag to True |
| 35 | this.convDevKVStore.IS_SHARD_MODE=True |
| 36 | |
| 37 | # Item 7: Assign the mapping function of value sharding |
| 38 | this.convDevKVStore.shardMapFunc.defineFunc: func(x)- |
| 39 | { |
| 40 | # Given the input userkey x, func outputs the KV pairs stored in convDevKVStore |
| 41 | # valShardBlockID is defined as the distance from the given userkey x to userKVStore's lowest key (i.e., the first userkey's valShardblockID is 0) |
| 42 | valShardNum = ceil(userKVStore.getValueSizeLimit( )/ devKVStore.getValueSizeLimit( )) |
| 43 | valShardBlockID = x-userKVStore.getLowestKey( ) |
| 44 | firstValShardKey = this.convDevKVStore.getLowestKey( )+ userKVStore.getHighestKey( )-userKVStore.getLowestKey( )+ (valShardBlockID) *valShardNum+1 |
| 45 | lastValShardKey = this.convDevKVStore.getLowestKey( )+ userKVStore.getHighestKey( )-userKVStore.getLowestKey( )+ (valShardBlockID+1)*valShardNum |
| 46 | return returnKVPairsInRange(firstValShardKey, lastValShardKey) |
| 47 | } |
| 48 | ##################################################### |
| 49 | ... |
| 50 | return |

Algorithm 6-1:

Algorithm 6-1

| | |
|---|---|
| 1 | Class UnivKVAdapter: |
| 2 | ... |
| 3 | # Function m |
| 4 | Procedure oneToOneMap(userKVStore): |
| 5 | # Constraint checking before conducting 1-to-1 mapping |
| 6 | if userKVStore.keySetSpaceSize( ) > this.convDevKVStore.keySetSpaceSize( ): |
| 7 | return ERROR(INSUFFICIENT_KEY) |
| 8 | else if userKVStore.valueLengthLimitSize( ) > this.convDevKVStore.valueLengthLimitSize( ): |
| 9 | return ERROR(INSUFFICIENT_VALUE) |
| 10 | else if userKVStore.NOT_FRAGMENTED_RANGE or this.convDevKVStore.NOT_FRAGMENTED_RANGE: |
| 11 | return ERROR(FRAGMENTED_RANGE) |
| 12 | # Constraint checking passed |
| 13 | else: |
| 14 | # this is one example of generating one-to-one mapping |
| 15 | # generate a mapping function and assign it to the KVMapper's mapping function |
| 16 | # x is the user key to be mapped, and func(x) is the returned mapped key in this.convDevKVStore |
| 17 | this.convDevKVStore.KVMapper.defineFunc: func(x)= |
| 18 | { |
| 19 | this.convDevKVStore.getLowestKey( )- userKVStore.getLowestKey( )+x |
| 20 | } |
| 21 | return |

Algorithm 7-1:

Algorithm 7-1

| | |
|---|---|
| 1 | Procedure get(key, version, value): |
| 2 | newKey=UnivKVAdapter.genKey(key, version) |
| 3 | return UnivKVAdpater.get(key) |
| 4 | |
| 5 | Procedure put(key, version, value): |
| 6 | newKey=UnivKVAdapter.genKey(key, version) |
| 7 | return UnivKVAdpater.put(newKey, value) |
| 8 | |
| 9 | Procedure delete(key, version): |
| 10 | newKey=UnivKVAdapter.genKey(key, version) |
| 11 | return Univia/Adpater.delete(key) |
| 12 | |
| 13 | Procedure update(key, version, value): |

| Algorithm 7-1 | |
|---|---|
| 14 | newKey=UnivKVAdaoter.genKey(key, version) |
| 15 | return UnivKVAdpater.update(key, value) |

The invention claimed is:

1. A method comprising:
determining a conversion strategy based on one or more characteristics of a first key-value store and one or more characteristics of a second key-value store;
converting the second key-value store to a converted key-value store based on the conversion strategy; and
mapping the first key-value store to the converted key-value store based on a mapping function;
wherein the determining the conversion strategy comprises:
comparing a key set space size for the first key-value store to a key set space size for the second key-value store; and
comparing a value length limit of the first key-value store to a value length limit of the second key-value store.

2. The method of claim 1, wherein the determining the conversion strategy further comprises comparing a data storage capacity of the first key-value store to a data storage capacity of the second key-value store.

3. The method of claim 1, wherein the determining the conversion strategy further comprises determining whether the second key-value store can borrow adequate key space from its value space.

4. The method of claim 1, wherein the determining the conversion strategy further comprises determining whether the second key-value store can borrow adequate value space from its key space.

5. A method comprising:
determining a conversion strategy based on one or more characteristics of a first key-value store and one or more characteristics of a second key-value store;
converting the second key-value store to a converted key-value store based on the conversion strategy; and
mapping the first key-value store to the converted key-value store based on a mapping function;
wherein the conversion strategy comprises borrowing resources within the second key-value store.

6. The method of claim 5, wherein the conversion strategy further comprises a packing arrangement.

7. The method of claim 5, wherein the conversion strategy further comprises a sharding arrangement.

8. A method comprising:
determining a conversion strategy based on one or more characteristics of a first key-value store and one or more characteristics of a second key-value store;
converting the second key-value store to a converted key-value store based on the conversion strategy; and
mapping the first key-value store to the converted key-value store based on a mapping function;
wherein the conversion strategy comprises scaling out the second key-value store.

9. A method comprising:
determining a conversion strategy based on one or more characteristics of a first key-value store and one or more characteristics of a second key-value store;
converting the second key-value store to a converted key-value store based on the conversion strategy; and
mapping the first key-value store to the converted key-value store based on a mapping function;
wherein the conversion strategy comprises scaling out the second key-value store in combination with a second conversion strategy.

10. A method comprising:
determining a conversion strategy based on one or more characteristics of a first key-value store and one or more characteristics of a second key-value store;
converting the second key-value store to a converted key-value store based on the conversion strategy;
mapping the first key-value store to the converted key-value store based on a mapping function; and
expanding a key set space size for the first key-value store.

11. The method of claim 10, wherein:
the conversion strategy is based on the expanded key set space size for the first key-value store; and
the converted key-value store is configured to store multiple versions of key-value pairs of the first key-value store based on the expanded key set size space.

* * * * *